(12) United States Patent
Aidoo et al.

(10) Patent No.: US 11,818,204 B2
(45) Date of Patent: Nov. 14, 2023

(54) SYSTEMS AND METHODS FOR CALCULATING CONSENSUS DATA ON A DECENTRALIZED PEER-TO-PEER NETWORK USING DISTRIBUTED LEDGER

(71) Applicant: Credit Suisse Securities (USA) LLC, New York, NY (US)

(72) Inventors: Emmanuel P. Aidoo, Englewood Cliffs, NJ (US); Dean N. Soteropoulos, Flemington, NJ (US); Christopher Dignam, Brooklyn, NY (US)

(73) Assignee: Credit Suisse Securities (USA) LLC, New York, NY (US)

( * ) Notice: Subject to any disclaimer, the term of this patent is extended or adjusted under 35 U.S.C. 154(b) by 652 days.

(21) Appl. No.: 16/554,490

(22) Filed: Aug. 28, 2019

(65) Prior Publication Data

US 2020/0074548 A1    Mar. 5, 2020

Related U.S. Application Data

(60) Provisional application No. 62/724,155, filed on Aug. 29, 2018.

(51) Int. Cl.
| | |
|---|---|
| *H04L 67/104* | (2022.01) |
| *G06Q 40/04* | (2012.01) |
| *G06Q 20/38* | (2012.01) |
| *H04L 47/70* | (2022.01) |
| *H04L 9/40* | (2022.01) |

(52) U.S. Cl.
CPC ......... *H04L 67/104* (2013.01); *G06Q 20/389* (2013.01); *G06Q 40/04* (2013.01); *H04L 47/82* (2013.01); *H04L 63/0442* (2013.01); *G06Q 2220/10* (2013.01)

(58) Field of Classification Search
None
See application file for complete search history.

(56) References Cited

U.S. PATENT DOCUMENTS

| | | | |
|---|---|---|---|
| 7,756,676 B1 * | 7/2010 | Shan | G06F 16/2477 |
| | | | 702/182 |
| 9,094,378 B1 * | 7/2015 | Yung | G06F 12/1408 |
| 10,223,547 B2 * | 3/2019 | Rane | H04L 9/008 |

(Continued)

FOREIGN PATENT DOCUMENTS

| | | | |
|---|---|---|---|
| CN | 1538334 A | * | 10/2004 |
| CN | 112232639 A | * | 1/2021 |
| WO | WO-2021059434 A1 | * | 4/2021 |

*Primary Examiner* — Neha Patel
*Assistant Examiner* — Jahed Ali
(74) *Attorney, Agent, or Firm* — Norton Rose Fulbright US LLP

(57) ABSTRACT

The present disclosure relates to methods and systems for calculating consensus data on a decentralized P2P network using a distributed ledger. Embodiments of the present disclosure provide for calculating, by a network node, data values corresponding to market rates associated with the network node, and sharing the data values with other network nodes. The data values from all network nodes are aggregated and a rule set applied to the aggregated data to determine and outlying values. Any network node that submitted an outlying value is designated as an outlier node. Consensus data is calculated based on data values that exclude data values from the outlier network nodes.

16 Claims, 7 Drawing Sheets

(56) References Cited

U.S. PATENT DOCUMENTS

| | | | |
|---|---|---|---|
| 10,394,691 B1* | 8/2019 | Cole | G06F 17/18 |
| 2003/0154044 A1* | 8/2003 | Lundstedt | G01N 35/00871 |
| | | | 702/181 |
| 2003/0236776 A1* | 12/2003 | Nishimura | G06Q 99/00 |
| | | | 707/999.009 |
| 2004/0139315 A1* | 7/2004 | Tokutani | H04L 63/08 |
| | | | 705/59 |
| 2004/0153249 A1* | 8/2004 | Zhang | G01N 33/6803 |
| | | | 702/19 |
| 2007/0228278 A1* | 10/2007 | Paximadis | G01J 5/02 |
| | | | 250/330 |
| 2010/0228496 A1* | 9/2010 | Leong | C12Q 1/6827 |
| | | | 702/19 |
| 2011/0249261 A1* | 10/2011 | Mertens | G01N 21/31 |
| | | | 356/326 |
| 2013/0227054 A1* | 8/2013 | Zhang | G06Q 30/06 |
| | | | 709/217 |
| 2013/0268458 A1* | 10/2013 | Ilardi | G06Q 10/067 |
| | | | 705/36 R |
| 2014/0032258 A1* | 1/2014 | Kato | G06Q 10/0633 |
| | | | 705/7.27 |
| 2014/0047551 A1* | 2/2014 | Nagasundaram | H04L 63/107 |
| | | | 726/26 |
| 2014/0096249 A1* | 4/2014 | Dupont | G06F 21/00 |
| | | | 726/23 |
| 2014/0270159 A1* | 9/2014 | Youn | H04L 9/0861 |
| | | | 380/44 |
| 2015/0180971 A1* | 6/2015 | Varney | H04L 67/2842 |
| | | | 709/204 |
| 2015/0235248 A1* | 8/2015 | Parris | G06Q 10/06315 |
| | | | 705/7.35 |
| 2015/0295716 A1* | 10/2015 | Liu | H04L 9/008 |
| | | | 713/191 |
| 2015/0310466 A1* | 10/2015 | LaCivita | G06Q 10/087 |
| | | | 705/7.34 |
| 2016/0021169 A1* | 1/2016 | Chan | H04L 67/52 |
| | | | 709/217 |
| 2016/0180478 A1* | 6/2016 | Cunningham | H04N 1/00 |
| | | | 705/26.62 |
| 2017/0046689 A1* | 2/2017 | Lohe | G06Q 20/40 |
| 2017/0078315 A1* | 3/2017 | Allen | H04L 63/1433 |
| 2017/0085555 A1* | 3/2017 | Bisikalo | G06F 3/0619 |
| 2017/0103103 A1* | 4/2017 | Nixon | G06F 16/256 |
| 2017/0199902 A1* | 7/2017 | Mishra | G06N 5/01 |
| 2017/0232300 A1* | 8/2017 | Tran | H04L 67/32 |
| | | | 434/247 |
| 2018/0117447 A1* | 5/2018 | Tran | G01L 5/0052 |
| 2018/0316707 A1* | 11/2018 | Dodson | H04L 41/40 |
| 2019/0050898 A1* | 2/2019 | Sarraute | G06N 7/005 |
| 2019/0074089 A1* | 3/2019 | Kochura | G16H 50/20 |
| 2019/0249249 A1* | 8/2019 | Werler | C12Q 1/6851 |
| 2020/0074548 A1* | 3/2020 | Aidoo | G06Q 20/389 |
| 2020/0160388 A1* | 5/2020 | Sabeg | H04L 63/0421 |
| 2020/0225242 A1* | 7/2020 | Haas | G16B 5/00 |
| 2020/0327252 A1* | 10/2020 | McFall | G06F 21/78 |
| 2021/0006368 A1* | 1/2021 | Fox | H04L 67/12 |

* cited by examiner

SYSTEMS AND METHODS FOR CALCULATING CONSENSUS DATA ON A DECENTRALIZED PEER-TO-PEER NETWORK USING DISTRIBUTED LEDGER

CROSS-REFERENCE TO RELATED APPLICATIONS

The present application claims priority to U.S. Provisional Application No. 62/724,155 filed Aug. 29, 2018 and entitled, "SYSTEMS AND METHODS FOR CALCULATING CONSENSUS DATA ON A DECENTRALIZED PEER-TO-PEER NETWORK USING DISTRIBUTED LEDGER," the disclosure of which is incorporated by reference herein in its entirety.

FIELD

The present invention relates to calculation of consensus data, and more particularly to calculating consensus data on a decentralized peer-to-peer network using a distributed ledger.

BACKGROUND OF THE INVENTION

In capital markets, at the end of an accounting period, firms conduct price testing of their trading positions to ensure that the firm's inventory is marked at fair value. In illiquid markets, this price testing may be performed by determining consensus market data. Obtaining consensus data involves combining individual market data from different participant firms who may be mutually distrusting. Because of this, the consensus data is vulnerable to manipulation by the individual participant firms.

Typically, the consensus market data is provided by a third-party vendor. This third-party vendor collects individual market data from each participant firm. The third-party vendor aggregates the individual market data and generates the consensus market data. The third party vendor charges the participant firms a significant fee for access to the consensus market data. Thus, the consensus market data is effectively sold by the third-party vendor to the participants. In an attempt to prevent manipulation of the consensus data, the systems used by the third-party vendor determine if any participant firms have submitted individual market data that lies beyond a statistically significant threshold from the mean of all submissions, i.e., a certain number of standard deviations from the mean of all submissions. Those outlier participant firms are either excluded from receiving the consensus market data, or must pay a premium to receive the consensus market data.

Also, in the existing third-party vendor systems, the individual market data of each participant firm is submitted in the clear, that is, without any obfuscation of the market data. Confidentiality of the submitted individual market data and anonymity of the submitting participant firm is accomplished by the third-party vendor simply not divulging the clear individual market data of each participant firm to other the participant firms, or which participant firm submitted which individual market data.

Based on the above considerations, the present invention recognizes that implementing a solution to obtain consensus data using distributed ledger technology without using a third-party vendor would be desirable for a number of reasons. For example, such a solution eliminates the need for a third-party vendor, which saves money. Furthermore, such a solution could employ methods and systems to share and validate consensus market data so that it cannot be easily manipulated by the member firms or by the third-party vendor.

However, implementing a solution to obtain consensus data using distributed ledger technology requires a technical implementation of a system in which the participants can anonymously share individual market data, while also keeping the content of the individual market data safe from disclosure to other participant firms. That is, a technical solution for hiding, from other participants, the identity of the participant submitting the data, as well as the data itself, would have to be devised. Moreover, a technical solution would also have to be provided to calculate, identify, and remove any outlier participants when calculating consensus market data, in order to prevent manipulation of the consensus market data.

BRIEF SUMMARY OF THE INVENTION

The present invention is directed to methods, systems, and network nodes configured to calculate a consensus value for a set of data values provided by a plurality of network nodes of a peer-to-peer network. In some embodiments, a network node is provided that comprises a data sharing module and a smart contract module. The data sharing module may be configured to calculate data values corresponding to market rates associated with the network node, and to transmit the data values to other network nodes of the plurality of network nodes of the peer-to-peer network. In some embodiments, the smart contract module may be configured to execute logic of a smart contract. The logic of the smart contract logic may include logic to receive other data values from the other network nodes and to aggregate the data values of the network node with the other data values from the other network nodes to generate an aggregated set of data values. The smart contract logic also may include logic to apply a rule set to the aggregated set of data values to determine outlying data values of the aggregated set of data values and to designate, based on the rule set, network nodes associated with the outlying data values as outlier network nodes. The smart contract logic may also be configured to calculate the consensus value based on a dataset of values received from a subset of the other nodes that excludes the outlier network nodes.

An example embodiment may be characterized as a network node for calculating a consensus value for a set of data values provided by a plurality of network nodes of a peer-to-peer network, which includes a data sharing module and a smart contract module. The data sharing module is configured to calculate data values corresponding to market rates associated with the network node and to transmit the data values to other network nodes of the plurality of network nodes. The smart contract module is configured to receive other data values from the other network nodes, aggregate the data values of the network node with the other data values from the other network nodes to generate an aggregated set of data values, apply a rule set to the aggregated set of data values to determine outlying data values of the aggregated set of data values, designate, based on the rule set, network nodes associated with the outlying data values as outlier network nodes, and calculate the consensus value based on a dataset of values received from a subset of the other nodes that excludes the outlier network nodes.

Another example embodiment may be characterized as a method for calculating a consensus value for a set of data values provided by a plurality of network nodes of a peer-to-peer network, which includes calculating, by a network node of the plurality of network nodes, data values corresponding to market rates associated with the network node. The method also includes transmitting, by a network node, the data values to other network nodes of the plurality of network nodes, and receiving, by logic of a smart contract executed by a processor of the network node, data values from the other network nodes. Further, the method includes combining, by the smart contract logic, the data values of the network node with the data values from the other network nodes to generate a combined set of data values, applying, by the smart contract logic, a rule set to the combined set of data values to determine outlying data values of the combined set of data values, designating, by the smart contract logic, based on the rule set, network nodes associated with the outlying data values as outlier network nodes, and calculating, by the smart contract logic, the consensus value based on resubmitted data values received from a subset of the other nodes that excludes the outlier network nodes.

An additional embodiment of the invention includes a system for calculating a consensus value for a set of data values provided by a plurality of network nodes of a peer-to-peer network. The system includes the plurality of network nodes, where at least one network node includes a data sharing module and a smart contract module configured to execute logic of a smart contract. The sharing module is configured to calculate data values corresponding to market rates associated with the at least one network node and to transmit the data values to a calculation node of the system. The smart contract logic includes logic to receive resubmitted data values from a subset of network nodes of the plurality of network nodes, wherein the subset of network nodes excludes networks node designated as outlier network nodes by the calculation node, combine the data values of the at least one network node with the resubmitted data values from the subset of network nodes to generate a combined set of data values, and calculate the consensus value based on the combined data values received from subset of network nodes. The system also includes the calculation node. The calculation node is configured to receive the data values from the data sharing module of the at least one network node, receive data values from the other network nodes, aggregate the data values of the at least one network node with the data values from the other network nodes to generate an aggregated set of data values, apply a rule set to the aggregated set of data values to determine outlying data values of the aggregated set of data values, designate, based on the rule set, network nodes associated with the outlying data values as outlier network nodes, and send an indication to each network node of the plurality of network nodes indicating whether each network node is an outlier network node or is not an outlier network node.

The foregoing has outlined broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings illustrate various non-limiting, examples of inventive aspects of the aforementioned methods, systems, and network nodes.

It should be appreciated by those skilled in the art that any functional diagrams herein represent conceptual views of illustrative systems. Similarly, it should be appreciated that any flow charts, flow diagrams, state transition diagrams, pseudo code, and the like represent various processes, which may be substantially represented in a computer readable medium and executed by a computer or processor, whether or not such computer or processor is explicitly shown.

DETAILED DESCRIPTION

Various features and advantages of the present disclosure are explained more fully with reference to the non-limiting embodiments that are illustrated in the accompanying drawings and detailed in the following description. Descriptions of well-known starting materials, processing techniques, components and equipment are omitted so as not to unnecessarily obscure the present disclosure. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Figure 1A:
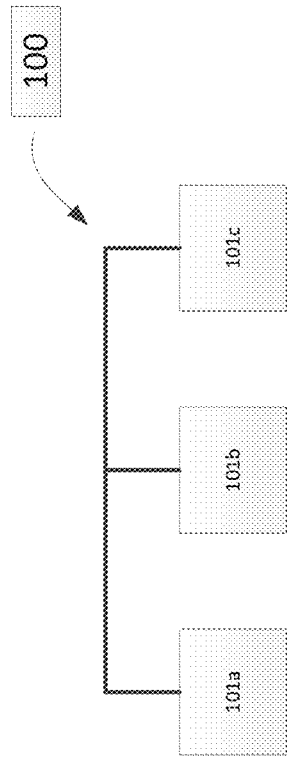
FIG. 1A is a block diagram of an exemplary decentralized network implemented in accordance with aspects of the present disclosure.

FIG. 1A illustrates an exemplary network 100 configured as a decentralized system for calculating consensus data implemented in accordance with aspects of the present disclosure. Aspects of the present disclosure provide an implementation of network 100 as a decentralized peer-to-peer (P2P) network using a distributed ledger in which individual data from each network node is shared between the network nodes, via the distributed ledger, and a consensus based on the combined data is calculated. In some aspects, the combined data excludes data from network nodes determined to be outlier nodes, such that the resulting consensus data does not include the values of the outlier nodes.

As used herein, a distributed ledger may refer to a type of database that is shared, replicated, and synchronized among the network nodes. The distributed ledger is configured to records transactions, such as the exchange of data, among the various network nodes in the network. When data in the distributed ledger changes, is added, or modified, the distributed ledger is synchronized across the entire network over which the distributed ledger is implemented. Therefore, the exchange and sharing of data between the network nodes of network 100 may be done via a distributed ledger that is distributed over the network nodes and implemented in a smart contract module of each network node. There may be no central mediator or controller of the distributed ledger. In some aspects, every record in the distributed ledger may have a timestamp and unique cryptographic signature. A distributed ledger may be implemented using blockchain technology that provides features to incorporate smart contracts, via smart contract logic. It is noted that some blockchain technology does not provide smart contract functionality and instead functions primarily as a ledger. In one particular example, a distributed ledger may be implemented in accordance with the present disclosure using the CORDA platform. In another particular example, a distributed ledger may be implemented in accordance with the present disclosure using the Ethereum platform.

Network 100, as illustrated, includes network nodes 101a, 101b, and 101c. It is noted that network 100 is not limited to only three network nodes as illustrated, but any number of network nodes may be included as part of network 100. Network nodes 101a, 101b, and 101c may be communicatively coupled to each other and may cooperate to exchange data and to aggregate the exchanged data for calculating a consensus of the data. In some aspects, network 100 may be configured as a P2P network. A P2P network is a decentralized network in which each network node self-organizes into overlay networks. Each network node may be a server, a personal computer laptop computer, personal data assistant (PDA), mobile telephone, or other processor-based computing device that is communicatively coupled to the P2P network. Each network node (sometimes called an overlay node an overlay network) acts as an application-layer caching and relaying data for other network node. In addition, by sharing their own resources, such as storage and network bandwidth, the capacity of the whole system is vastly amplified compared to traditional client-server architecture.

It should be appreciated that an implementation of a consensus data system for calculating consensus data on a decentralized peer-to-peer ("P2P") network using a distributed ledger may not have a centralized controller for managing access to the submitted data and/or the operations for calculating the consensus data. Moreover, including a centralized controller may not be desirable in a decentralized system using a distributed ledger, as one of the advantages of implementing a system for calculating consensus data on a decentralized P2P network using a distributed ledger is the ability to remove the centralized controller, which may be susceptible to manipulation. As noted above, ensuring anonymity of the participants, as well as anonymity of the submitted data is extremely important to prevent manipulation of the consensus data. Also of importance is preventing participants from manipulating the data by submitting outlying data values to influence the consensus data results. As such, several technical approaches for calculating consensus data while preventing access to the identity of the network nodes submitting data, as well as to the data itself, by other network nodes have been devised by the inventors and are described herein and in more detail below. The technical approaches described herein also describe techniques for determining outlier network nodes, and to exclude the outlier network nodes from the calculation of the consensus data, thereby ensuring that the consensus data results are not influenced by bad actors.

It is noted that the technical approaches described below represent technical innovations that were developed in response to a technical challenge and are thus technological in nature. These technical innovations are not mere implementations of previously known activities. Instead, these technical innovations were developed to address the technical challenges that arise from implementing a system for calculating consensus data on a decentralized P2P network using a distributed ledger. Based on the foregoing, it is further noted that the present disclosure describes specific implementations of technical solutions to technical problems.

It is also noted that in the discussion that follows, operations of network 100 will be described with respect to operations of a particular network node or nodes. However, those operations may be also be performed by other network nodes of network 100. As such, it should be appreciated that network nodes 101a, 101b, and 101c cooperate with one another to generate, transmit, receive, and exchange data used to calculate consensus data in accordance with aspects of the present disclosure. Additionally, although aspects of the disclosure are discussed with respect to calculating consensus data for a decentralized P2P network, the techniques, methods, and systems discussed herein may be equally applicable to any decentralized system or network in which submission of data, and the data itself, are required to be anonymous. As such, the disclosure herein is not limited to a decentralized P2P network and the description of a decentralized P2P network is for illustration purposes.

Exemplary Network Node

Figure 1B:
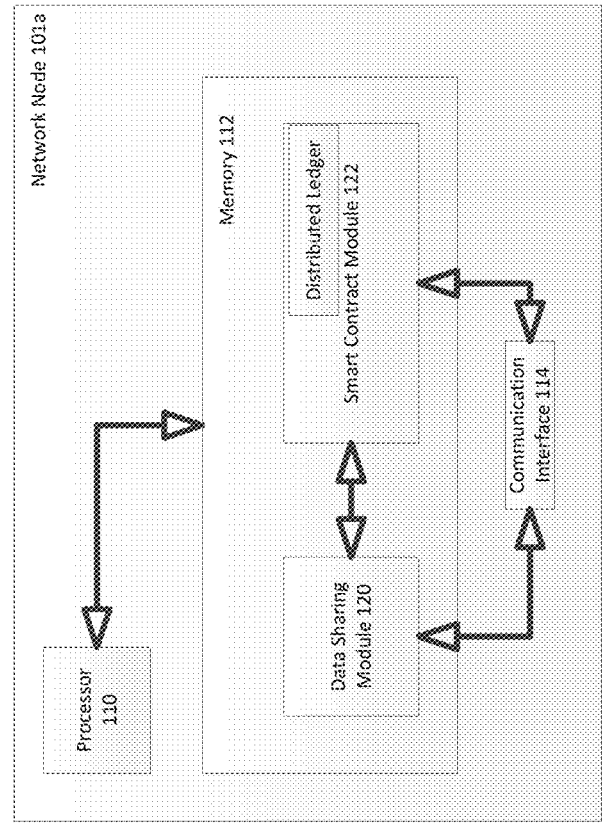
FIG. 1B is a functional diagram of an exemplary network node apparatus configured with capabilities and functionality for calculating consensus data according to aspects of the present disclosure.

FIG. 1B shows a diagram illustrating aspects of an exemplary network node shown as network node 101a. In some aspects, network node 101a may be configured to calculate consensus data based on data provided by the network nodes of network 100. For example, network node 101a may be associated with a particular firm, company, or organization. At the end of an accounting period, the particular firm may perform price testing against a consensus market value using market data compiled for the accounting period. These market data may consist of prices, or rates, used to mark-to-market the firm's trading positions. The consensus market value used for price testing may be part of consensus data calculated based on market data provided by the network nodes of network 100, and which includes the data generated by network node 101a, as well as data generated by other network nodes of network 100. For example, in some aspects, other network nodes of network 100 (see FIG. 1A) may be associated with other firms, and these network nodes may also generate their own market data. In order to calculate consensus data, network node 101 may receive market data from other nodes, may aggregate the market data of network node 101a and the market data of the other network nodes, and may compute consensus data using the aggregated data. In some aspects, the aggregated data excludes data from network nodes determined to be outlier nodes, such that the resulting consensus data does not include the values of the outlier nodes.

As shown in FIG. 1B, network node 101a may include processor 110, memory 112, and communication interface 114. Memory 112 may include ROM devices, RAM devices, one or more HDDs, flash memory devices, SSDs, other devices configured to store data in a persistent or non-persistent state, or a combination of different memory devices. In aspects, memory 112 may store executable instructions that, when executed by processor 110, cause processor 110 to perform operations of network node operating according to aspects of the present disclosure, as described herein. The communication interface 114 of network node 101a may communicatively couple network node 101a to one or more other network nodes (as shown in FIG. 1A) via wired or wireless communication links established according to one or more communication protocols or standards (e.g., a Bluetooth protocol, an Ethernet protocol, a transmission control protocol/internet protocol (TCP/IP), an Institute of Electrical and Electronics Engineers (IEEE) 802.11 protocol, and an IEEE 802.16 protocol, a 3rd Generation (3G) protocol, a 4th Generation (4G)/long term evolution (LTE) protocol, etc.). Data from the other network nodes may be received by network node 101a via communication interface 114. Similarly, data from network node 101a may be provided to other network nodes of network 100 via communication interface 114.

Network node 101a may also include data sharing module 120 and smart contract module 122. In some aspects, data sharing module 120 and smart contract module 122 may be implemented as software, logic, or executable instructions stored in memory 112, that are retrieved from memory 112 and executed by processor 110 to perform operations of the modules in accordance with aspects of the present disclosure. In other aspects, data sharing module 120 and smart contract module 122 may be implemented as hardware modules, or may be implemented as some combination of software and hardware. For example, in one particular implementation, functionality of smart contract module 122 may be implemented using a calculation chip (e.g., Intel SGX chip, Intel Xeon processor, a cloud or data center-hosted Hardware Security Module (HSM), or other hardware and/or software that provides equivalent functionality for secure cryptographic storage in hosted environments) to perform operations in accordance with aspects of the present disclosure discussed below.

In some aspects, data sharing module 120 may be configured to calculate data values corresponding to market rates associated with network node 101a. In some aspects, the market rate may be associated with a financial index/instrument. For example, the market rates may be associated with instruments such as an equity instrument or a derivative. As noted above, network node 101a may be associated with a particular firm, company, or organization. In these aspects, data sharing module 120 may use the market rates/prices to generate data values representing those market rates/prices. The data values may eventually be aggregated with the data values from other network nodes and be used in determining outlier network nodes and in calculating consensus data.

In aspects, data sharing module 120 may be further configured to obfuscate the data values generated from the market rates/prices such that the data values may be hidden from other network nodes. In these aspects, when other nodes receive the obfuscated data values from network node 101a, the other nodes may not be able to determine what the data may be. As such, operations of data sharing module 120 in accordance with the present disclosure to share data values for calculating consensus data ensure that the data submitted by network node 101a is anonymous data. It is noted that specific examples of the data obfuscation techniques implemented by data sharing module 120 are discussed in more depth in the discussion that follows below.

Data sharing module 120 may be further configured to transmit the data values of network node 101a to the other nodes of network 100. For example, sharing module 120 may be communicatively coupled with communication interface 114. Sharing module 120 and communication interface 114 may cooperate to transmit the data values of network node 101a to the other nodes of network 100. In this manner, data values from network node 101a are shared with other network nodes of network 100. In some implementations, the data values from network node 101a are shared via a distributed ledger implemented in smart contract module 122, as discussed below.

In some aspects, data sharing module 120 may also be configured to receive data values from the other nodes of network 100. For example, sharing module 120 and communication interface 114 may cooperate to receive the data values of network node 101a to the other nodes of network 100. In this manner, data values from other network nodes of network 100 are shared with network node 101a. In some implementations, the data values from the network nodes of network 100 are shared via a distributed ledger implemented over network 100. It is noted that in some aspects, the data values from the other network nodes of network 100 are received by smart contract module 122 in cooperation with communication interface 114 of network node 101a.

In aspects, the time and frequency of the data submissions by the network nodes of network 100 may be determined based on network 100's configuration. For example, configuration of network 100 may specify what time each particular network is to transmit the corresponding data values to other network nodes, and how frequently to transmit the data. For example, a particular node may be configured to transmit its data multiple times a day, once a day, once a week, or once a month. It should be noted that, in aspects, the time and frequency of the data transmissions may be determined by the smart contract logic executing on the network nodes, and may be based on requirements of the distributed ledger implementation. In some aspects, the time and frequency of the data transmissions from the network nodes may be based on the amount of data that is transmitted from the network nodes and based on the time and/or computing processing required for processing the particular amount of data. For example, in some implementations, the amount of data may be large, and may require intensive amounts processing power to process the data. In such instances, the frequency of the data transmissions may be configured to be monthly, or weekly. As the processing is improved, or as more processing power is added to the system, the frequency of the data transmissions may be increased such that consensus data calculations are performed more frequently. In some aspects, a quorum of network nodes may be required before a current round of consensus calculation is allowed to proceed. For example, when a number of network nodes submitting data values is below a predetermined number, then a quorum may not be declared and the consensus calculation process may not continue. In some cases, the predetermined number of network nodes required to declare a quorum and to allow the consensus data process to continue may be determined by the network configuration or may be based on a percentage of the number of nodes in network 100. For example, in a particular implementation, a minimum of five submissions may be required to declare a quorum and to allow a current round of consensus calculations to proceed. In other examples, a minimum of six submissions may be required to declare a quorum. It is noted that in some aspects, any number up to the number of available network nodes may be determined to be the minimum number of submissions to declare a quorum. In some implementations, the submission with the highest rate value, and the submission with the lowest rate value may be trimmed. In this case, the minimum number of submissions required to declare a quorum may take into consideration the trimming of the highest and lowest submission. As used herein, a round of consensus data calculation may refer to the process that includes the exchange of data values by the network nodes, the determination of the outliers, the calculation of the consensus data, and the release of the consensus data to the network nodes.

Smart contract module 122 of network node 101*a* may be configured to calculate consensus data from the data values submitted by the network nodes of network 100. It is noted that, in aspects, smart contract module 122 may be implemented as a closed subsystem, such that the operations of smart contract module 122 may be inaccessible to network node 101*a*. For example, functionality of smart contract module 122 may be implemented in smart contract logic executing on the computer environment of network node 101*a*. Smart contract logic, as used herein, may refer to executable code that is stored, replicated, and synchronized across the network nodes over a distributed ledger and which performs operations on the data shared via the distributed ledger. Smart contract logic of a particular node may also interact with the smart contract logic of another network node and so may cooperate to perform operations in accordance with the present disclosure.

The smart contract logic of smart contract module 122 may also implement a distributed ledger for sharing the data values exchanged by the network nodes. In this example, the environment of network node 101*a* may not have the ability to modify the smart contract logic, to manipulate the data from the network nodes, or even to perform calculations on the data. Even more, because a distributed ledger is used to exchange the data values between the network nodes, the submissions of the data values to the network may be anonymous and the different network nodes may not be able to identify who is submitting what data. In some aspects, the immutability of the smart contract logic may be configured using the blockchain platform. For example, the platform may be configured to prevent any manipulation of data, or may be configured to generate alerts to each node if any data is altered or manipulated. Furthermore, in some aspects, the smart contract logic may not be implemented in processor 110, but may instead be implemented in a separate, stand-alone calculation chip. In these aspects, manipulation of the data, and calculations on the data, may be performed by the smart contract logic, without intervention or access to the data from network node 101*a*. As such, in these aspects, participant firms associated with the network nodes may not have the ability to manipulate any of the underlying data or logic besides initially submitting their rates/prices as data values.

In aspects, configuration of smart contract module 122 to calculate consensus data from the data values submitted by the network nodes of network 100 may include configuring smart contract module 122 to combine the data values of network node 101*a* with the data values received from the other network nodes to generate a combined set of data values. For example, the data values of network node 101*a* may be aggregated with the data values received from the other network nodes to generate an aggregated set of data values. In some aspects, the data values of network node 101*a* and the data values received from the other network nodes may be obfuscated by the data sharing module of the respective nodes before being shared to other network nodes. In some aspects, the combined set of data values may also be obfuscated.

Smart contract module 122 may also be configured to determine outlying data values in the combined set of data values. As noted above, the data values submitted by each network node to be used in computing consensus data represent market data associated with a respective firm associated with the network node submitting the data values. In some cases, the submitted data may be manipulated by the respective firm in attempt to influence the resulting consensus value. For example, a firm attempting to manipulate the consensus price so that it is higher than it should be may submit artificially higher market values so that the calculation of the consensus value results in a higher consensus price. In order to prevent this, smart contract module 122 may be configured to determine outlying data values in the combined set of data, and to remove the outlying values from the calculation of the consensus data, in order to prevent manipulation of the consensus data result.

Although in the discussion that follows several specific examples of techniques implemented by smart contract module 122 to calculate consensus data also discuss different techniques for determining outliers in accordance with the present disclosure, it is noted that calculating outliers in accordance with the present disclosure may follow broad general rules. For example, an outlying value may be a value that falls outside a certain range or threshold from the mean calculated over the combined data values. The certain range or threshold may be measured in terms of standard deviations from the mean, or may be measured in terms of an acceptable percentage of the range of values. In other aspects, an outlying value may refer to a value that falls within the certain range or threshold, but fails a quality check applied to the value, as described in further detail below. Outlying values may be removed from the calculation of the consensus data and the network node associated with the outlying value may not be allowed to receive consensus data, or may be allowed to receive the consensus data after paying a fee, based on certain rules as described further below.

In one particular example, after a network node has submitted outlying values for a certain number of consecutive rounds, the network node may be prevented from participating in the calculation of the data, and from receiving the data, even for a fee, until the network node submits a non-outlying value. In some aspects, an outlying value may be designated as a "significant outlier" or as a "not significant outlier." The designation of an outlying value would also be imputed to the particular network node that submitted the outlying value and to the firm, or organization associated with the particular network node. In some aspects, a "significant outlier" may refer to a value that lies outside a threshold number of standard deviations from the mean of the combined data values. For example, a value may be designated a "significant outlier" when the value lies at least two standard deviations or more from the mean. In aspects, a "not significant outlier" may refer to a value that lies within the threshold number of standard deviations from the mean of the combined data values, but has failed a quality check. For example, a value may be designated a "not-significant outlier" when the value lies within two standard deviations from the mean, but the value has failed a quality check. The quality check may involve statistical analysis techniques, such as scatter plot and/or linear regression in order to identify relevant data and selectively exclude significant outliers from participation in the consensus calculations.

In some implementations, the first time a not significant outlier submits an outlying value, the not significant outlier may be allowed to receive consensus data without paying a fee. The second time the not significant outlier submits an outlying value, the not significant outlier may be allowed to receive consensus data only after paying a fee. The third time the not significant outlier submits an outlying value, the not significant outlier may not be allowed to receive consensus data even for fee, and may also be prevented from participating and receiving further consensus data until the not significant outlier submits good values. In some aspects, the not significant outlier may only be allowed to participate and receive the consensus data after the not significant outlier has submitted good values for three consecutive rounds. In aspects, the first time a significant outlier submits an outlying value, the significant outlier may be allowed to pay for the consensus data. The second time the significant outlier submits an outlying value, the significant outlier may be allowed to receive consensus data after paying a fee. The third time the significant outlier submits an outlying value, the significant outlier may not be allowed to receive consensus data even for fee, and may also be prevented from participating and receiving further consensus data until the significant outlier submits good values. In some aspects, the significant outlier may only be allowed to participate and receive the consensus data after the significant outlier has submitted good values for three consecutive rounds. A more in depth discussion of the significant/not-significant outlier and payment scheme for the consensus data process follows below with respect to FIG. 7.

In one example, for nodes submitting rates with significant outliers, any combination of several actions may be taken. For example, the significant outlier node may be throttled to limit the significant outlier node submissions and/or performance with respect to the consensus calculation system, and/or the significant outlier node may be blocked for a duration of time or may be blocked permanently. In aspects, significant outlier nodes may be assigned a risk or reputation score. The reputation score may be taken into consideration with respect to subsequent submissions by the significant outlier nodes. For example, when a network submits one significant outlier rate, the network node may receive a medium reputation score (e.g., reputation score=5.0/10). With every subsequent submission, the reputation score may be increased or decreased. For example, a subsequent outlier submission by the node may decrease the node's reputation score to 4.5/10. In contrast, a subsequent non-outlier submission by the node may instead increase the node's reputation score to 5.5/10. It is noted that the graduation of the reputation score scale may be determined by a network operator and that the amount of the increase/decrease per submission may be configured to be any value within the scale range. For example, each submission may be assigned a particular value, (e.g., a value between 0.1/10 and 5/10), or a value may be specified for a set number of consecutive submissions of a particular quality (e.g., 1/10 points for 3 consecutive outlier submissions or for 3 consecutive non-outlier submissions). In this example, rules may be implemented to take action based on threshold reputation scores. For example, the network operator or the system logic, may implement an automated or manual process to ban from participation in the consensus calculation any node with a reputation score below a threshold. For example, any node with a reputation score below 4.5/10 may be banned from participation in the consensus calculation. The threshold may be expressed in terms of a value, or may be expressed as a percentage of the total scale. For example, the threshold may be a value between 0 and 90% of the total value scale. In some aspects, the reputation scale may be divided into levels, such as low, medium, and high, and decisions to allow a node to participate in the consensus calculation, to receive the consensus score for free, and/or to receive the consensus score for a fee may be based on what reputation level the node has. For example, a node with a low reputation score may be prevented from participating and receiving the consensus calculation, a node with medium reputation score may be prevented from participating in the consensus calculation but may be allowed to receive the results, and a node with a high reputation score may have no restriction. In some aspects, all participating network nodes may initially receive a predetermined reputation score, and the reputation score may vary based on the quality of the submission by the node, as explained above.

In aspects of the present disclosure, smart contract module 122 of network node 101a is configured to calculate a consensus data value based on the combined set of data values from the network nodes of network 100. In some aspects, the calculation of the consensus data value is performed on the combined set of data values received from the network nodes, after outlying values have been removed from the combined set of data values. In other aspects, after outlying values have been identified, smart contract module 122 of network node 101a may send a request to the other network nodes that have not been designated as outliers to resubmit their data values. In some aspects, the data values are resubmitted to the other network nodes without obfuscation of the data values. The consensus data may then be calculated based on the resubmitted data values, which may exclude the data values from the outlier network nodes.

One-Way Hash Approach

Figure 2:
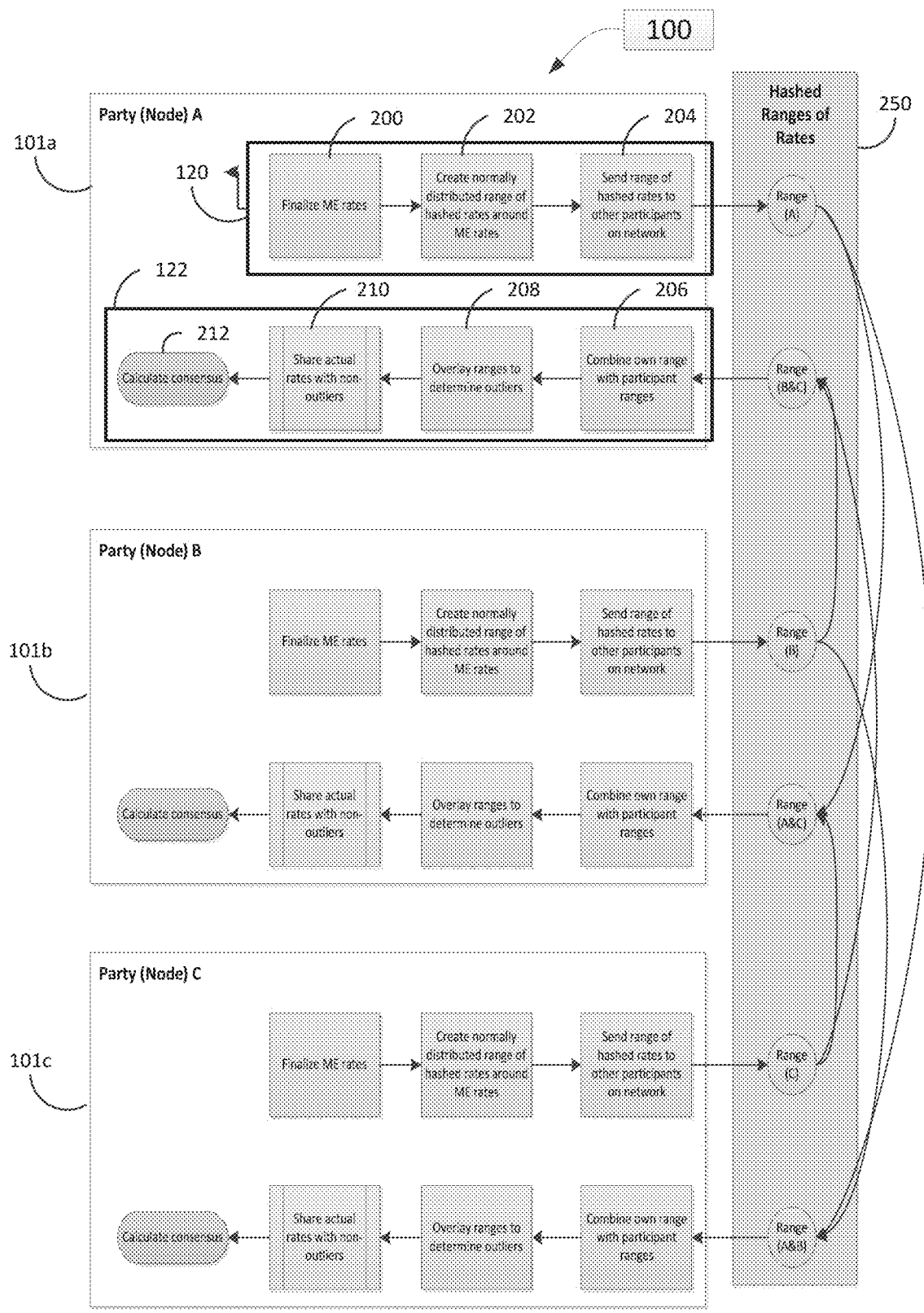
FIG. 2 is an exemplary functional diagram for calculating consensus data in a peer-to-peer network according to aspects of the present disclosure.

In aspects of the present disclosure, consensus data for a decentralized P2P network may be calculated implementing a one-way hash approach. FIG. 2 shows an exemplary functional diagram illustrating one aspect implementing a one-way approach in accordance with aspects of the present disclosure. As shown in FIG. 2, exemplary network nodes 101a-c may each include a data sharing module and a smart contract module. Although FIG. 2 is primarily described with respect to network node 101a, it is noted that the described operations may be also be performed by network nodes 101b and 101c.

At block 200, data sharing module 120 may finalize market rates for a particular market instrument. As noted above, these market rates may represent market data compiled for an accounting period of a particular firm associated with network node 101a, and the market rates may be associated with a particular market instrument. At block 202, smart contract module 122 may obfuscate the market rates. For example, smart contract module 122 may calculate, for market rate submissions for a specified interval, a range of values normally distributed around the rate to be submitted for a particular market instrument. The range of values may be calculated such that the rate to be submitted is the mean of the range of values. After the range of values is calculated, a one-way hashing encryption may be applied to the range of values to generate a range of hashed values. In some aspects, the range of hashed values may be represented by a range of hexadecimal hashes. As used herein, a one-way hash encryption may refer to a one-way, message digest (MD), fingerprint, or compression function, and may refer to a mathematical process that converts an input value into a fixed-length binary sequence. Example implementations of one-way hash algorithms may include MD4, MD5, SHA-1, SHA-2, SHA-3, RIPEMD160, BLAKE2, WHIRPOOL etc.

At block 204, the range of hashed values calculated for each market rate is sent to other network nodes of network 100. For example, data sharing module 122 of network node 101a may transmit the calculated range of hashed values for each market rate to network nodes 101b and 101c. Network nodes 101b and 101c may also calculate a range of hashed values for each of their respective market rates and share the calculated range of hashed values with the other nodes. For example, network node 101b may share the calculated range of hashed values with network nodes 101a and 101c, and network node 101c may share the calculated range of hashed values with network nodes 101a and 101b. As such, as seen at block 250, the range of hashed values for each network node is shared across the entire network 100. In some aspects, the range of hashed values is shared between the network nodes via the distributed ledger. For example, network node 101a may share the calculated range of hashed values with network nodes 101b and 101c via the distributed ledger implemented over network nodes 101a, 101b, and 101c.

Smart contract module 122 of network node 101a may receive the range of hashed values from network nodes 101b and 101c and, at block 206, may combine its own range of hashed values with the ranges of hashed values received from network nodes 101b and 101c. For example, smart contract module 122 may aggregate the range of hashed values calculated at block 202 with the ranges of hashed values received from network nodes 101b and 101c. At block 208, smart contract module 122 of network node 101a may apply set theory to the aggregated ranges of hashed values to determine any overlaps between the different ranges of hashed values. For example, smart contract module 122 may overlay or collate all the received ranges of hashed values to determine the hashed values where the ranges overlap. In some aspects, when the overlapped hashed values from a range of hashed values received from a particular network node does not exceed a predetermined threshold, then smart contract module 122 designates that particular network node as an outlier. For example, for a predetermined threshold of 80%, if only 70% of the hashed values in the range of hashed values received from network node 101b overlap with the hashed values of the other network nodes, then network node 101b may be designated as an outlier. In the same example, if 90% of the hashed values in the range of hashed values received from network node 101c overlap with the hashed values of the other network nodes, then network node 101c may not be designated as an outlier. The threshold may be expressed as a percentage, fraction, or number of hashed values. A network node whose associated range of values has overlapped hashed values that exceed the predetermined threshold may still be designated as an outlier based on the result of a quality check applied to the submitted values. In aspects, statistical analysis techniques such as scatter plot and/or linear regression may be applied to the hashed values in order to identify and designate significant outliers.

In aspects, any node designated as an outlier based on the overlap determination at block 208 may not be allowed to participate in the consensus data calculation. For example, having identified any outliers at block 208, smart contract module 122 may send a request to all network nodes that have not been designated as outliers to submit their respective market rates again. In another example, the outlier nodes may receive a reputation score, which may be adjusted based on the outlier submission, and may be allowed to participate in the consensus data calculation based on the reputation score. For example, if the outlier submission brings the network node's reputation score below a predetermined threshold, the network node may not be allowed to participate in the consensus data calculation. However, if the network node's reputation score meets or exceeds the threshold, the network node may be allowed to participate in the consensus data calculation. In some aspects, the request may be a signal or a message. The request may also allow a node to resubmit new rates for any rates that may have been submitted in error. It will be appreciated that, when network node 101a has not been designated as an outlier by the other network nodes, network node 101a may receive the request from the other network nodes. Similarly, it should be appreciated that a network node that has been designated as an outlier may not receive the request to resubmit the market rates for the consensus data calculation.

At block 210, in response to the request to resubmit market rates, smart contract module 122 of network node 101a may resubmit the market rates without obfuscating the data. For example, smart contract module 122 may send the actual market rates to the network node 101c, as network node 101c was not designated as an outlier, without calculating a range of hashed rates. Similarly, every other network node not designated as an outlier, or that has been authorized to resubmit the market rates, may send their respective market rates to network node 101a. It should be appreciated that, during this operation, the participant network nodes may view each other's submissions, although the network nodes may be configured such that the identities of the participants may still be anonymous (or pseudo-anonymous) as the data values are shared between the network nodes via the distributed ledger implemented in smart contract module 122.

Smart contract module 122 may receive the market rate data from the other network nodes and may aggregate the received data with its own market rates to generate aggregated market data. At step 212, network node 101a calculates a consensus data value for the market instrument based on the aggregated data. In some aspects, calculating the consensus data may include calculating a value using statistical analysis such as an average of the aggregated values for a particular rate. For example, in some implementations, the highest value and the lowest value may be removed from the aggregated values, and after removal, an arithmetic average may be calculated on the remaining values of the aggregated values. In some aspects, removing the highest and lowest value from the data set before calculating the average may be implemented in each of the consensus data calculation approaches discussed herein. In alternative or additional aspects, calculating the consensus data may include calculating a weighted average of market rates submitted by particularly reputable sources or by submitters who hold significant portions of the holdings associated with the market instruments.

Homomorphic Encryption Approach

Figure 3:
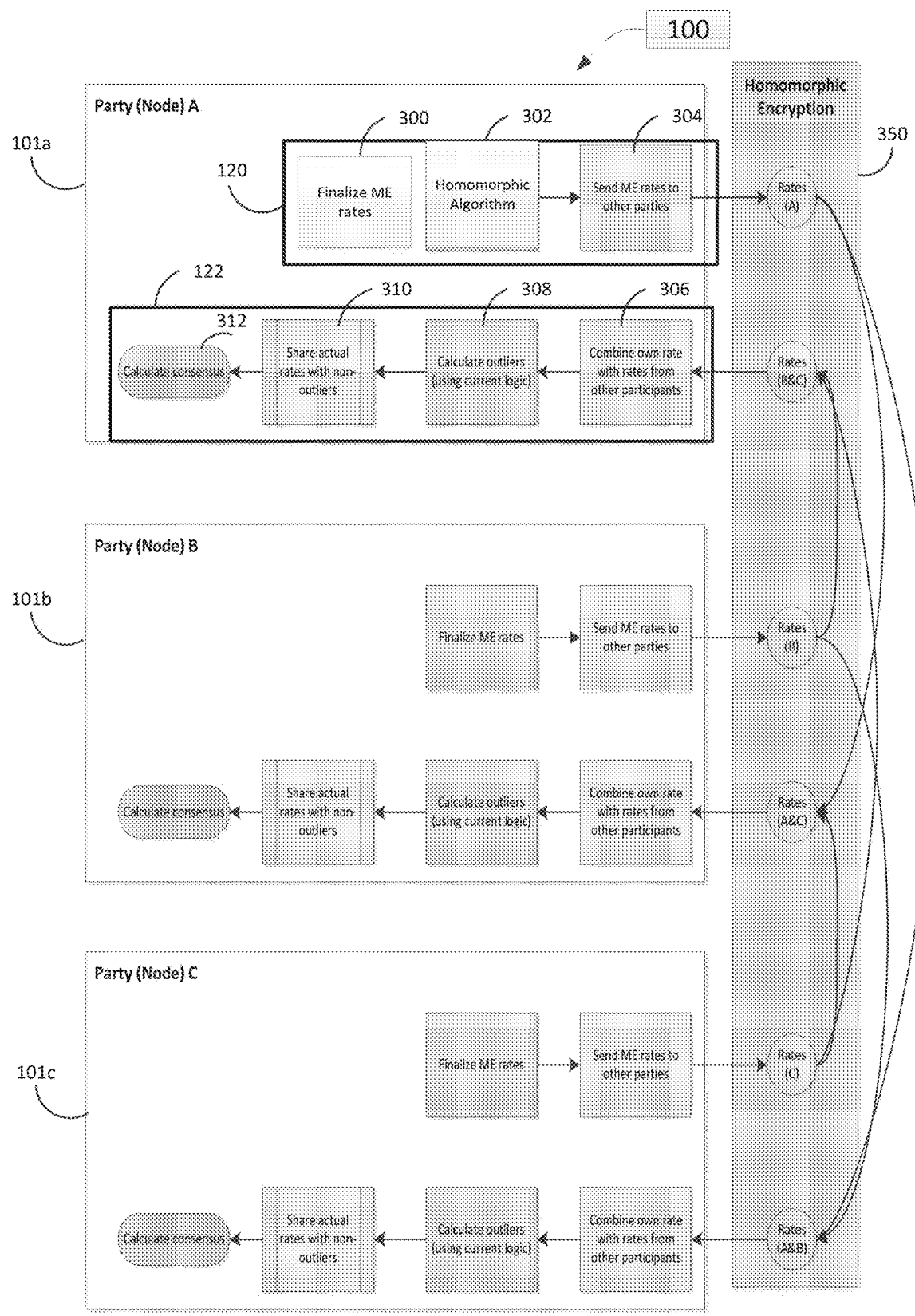
FIG. 3 is another exemplary functional diagram for calculating consensus data in a peer-to-peer network according to aspects of the present disclosure.

In further aspects of the present disclosure, consensus data for a decentralized P2P network may be calculated implementing a homomorphic encryption approach. FIG. 3 shows an exemplary functional diagram illustrating one aspect implementing a homomorphic encryption approach in accordance with aspects of the present disclosure. As shown in FIG. 3, exemplary network nodes 101a-c may each include a data sharing module and a smart contract module. Although FIG. 3 is primarily described with respect to network node 101a, it is noted that the described operations may be also be performed by network nodes 101b and 101c, and other network nodes not shown.

At block 300, data sharing module 120 may finalize market rates associated with a particular market instrument. As noted above, these market rates may represent market data compiled for an accounting period of a particular firm associated with network node 101a. At block 302, smart contract module 122 may obfuscate the market rates. For example, smart contract module 122 may apply a homomorphic algorithm to calculate, for market rate submissions for a specified interval, a homomorphically encrypted ciphertext value. As used herein, a homomorphic algorithm may refer to an algorithm for encrypting data such that the data is encrypted into a ciphertext. Such homomorphic algorithms allow operations and calculations to be performed on the homomorphically encrypted ciphertext without decrypting the ciphertext first. In homomorphic encryption, the results of operations on the ciphertext match the results of the same operations performed on the plaintext. For example, a cryptosystem library may be used to generate a private secret-keyset for encryption/decryption, and a cloud-keyset may be used to perform homomorphic computations using a public or private cloud, or in a data center infrastructure maintained by a network operator.

In embodiments, second generation homomorphic cryptosystems may be used (e.g., Homomorphic Encryption Library (HElib), Fully Homomorphic Encryption Library (FHEW), Fast Fully Homomorphic Encryption Library (TFHE), etc.). The homomorphic encryption system may generate a secret-keyset and a cloud-keyset. The secret keyset may be private, and may facilitate encryption/decryption features. The cloud-keyset may be exported to the cloud or may be controlled by a private network maintained by a network operator. The cloud-keyset may also allow operation over encrypted data. The homomorphic encryption system may also facilitate encrypting and decrypting of data using the secret keyset. The encrypted data may be safely outsourced to the cloud, in order to perform secure homomorphic computations. The homomorphic encryption system may further, using the cloud-keyset, evaluate a net-list of binary gates homomorphically at a rate of about 76 gates per second per core, without decrypting its input. Providing the sequence of gates, as well as ciphertexts of the input bits, may be sufficient. The homomorphic encryption system may compute ciphertexts from the output bits.

At block 304, the encrypted ciphertext calculated for each market rate may be sent to other network nodes of network 100. For example, data sharing module 122 of network node 101a may transmit the encrypted ciphertext for each market rate to network nodes 101b and 101c. Network nodes 101b and 101c may also calculate encrypted ciphertext for each of their respective market rates and share the encrypted ciphertext with the other nodes. For example, network node 101b may share the encrypted ciphertext with network nodes 101a and 101c, and network node 101c may share the encrypted ciphertext with network nodes 101a and 101b. As such, as seen at block 350, the encrypted ciphertext for each network node is shared across the entire network 100. In some aspects, the encrypted ciphertext is shared between the network nodes via a distributed ledger. For example, network node 101a may share the encrypted ciphertext with network nodes 101b and 101c via a distributed ledger implemented over network nodes 101a, 101b, and 101c.

Smart contract module 122 of network node 101a may receive the encrypted ciphertext representing the data values from network nodes 101b and 101c and, at block 306, may combine its own encrypted ciphertext with the encrypted ciphertexts received from network nodes 101b and 101c. For example, smart contract module 122 may aggregate the encrypted ciphertext calculated at block 302 with the encrypted ciphertexts received from network nodes 101b and 101c. At block 308, smart contract module 122 of network node 101a may apply a rule set to the aggregated encrypted ciphertexts to determine any outlier network nodes. For example, smart contract module 122 of network node 101a may calculate the mean and standard deviation of the aggregated encrypted ciphertext values from network nodes 101a-c. Smart contract module 122 may then measure every data point represented by each encrypted ciphertext value to determine any ciphertext value that lies beyond a threshold amount of standard deviations from the calculated mean. For example, smart contract module 122 may measure every data point represented by each encrypted ciphertext value to determine any ciphertext value that lies beyond two standard deviations from the calculated mean. In this example, any ciphertext value determined to lie beyond two standard deviations from the calculated mean may be designated an outlying value. The particular network node that submitted the outlying values may then be identified and smart contract module 122 may designate that particular network node as an outlier.

In some aspects, when the outlying value lies beyond two standard deviations from the calculated mean, the associated network node may be designated as a "significant" outlier. In some aspects, a quality check may be applied to values that lie within two standard deviations from the calculated mean. Any value that fails the quality check may be designated a not significant outlying value and the associated network node may be designated as a "not significant" outlier. For example, when smart contract module 122 of network node 101a determines that a value in the encrypted ciphertext values received from network node 101b lies within two standard deviations from the calculated mean, a quality check may be applied. If the encrypted ciphertext value fail the quality check, then smart contract module 122 may designate network node 101b as a not significant outlier. In the same example, if smart contract module 122 of network node 101a determines that no value in the encrypted ciphertext values received from network node 101c lies beyond two standard deviations from the calculated mean, and no ciphertext values fail the quality check, then network node 101c may not be designated as an outlier.

In aspects, any node designated as an outlier based on the calculation at block 308 may not be allowed to participate in the consensus data calculation. For example, having identified network node 101b as an outlier at block 308, smart contract module 122 would not include data from network 101b in the calculation of the consensus data described below. However, in some aspects, outlier network nodes that submitted a data point that lies beyond two standard deviations from the mean of all submissions may be allowed to receive the consensus data, once calculated, for a fee, as described with respect to FIG. 7 below. In some aspects, outlier network nodes that submit a data point that lies beyond two standard deviations of the mean of all submissions, or that fails the quality check twice in a row, may be allowed to receive the consensus data results for a fee. In further aspects, outlier network nodes that submit a data point that lies beyond two standard deviations from the mean of all submissions, or that fail the quality check more than twice in a row, may not be allowed to receive the consensus data results, even for a fee, and may be prevented from participating and/or receiving the consensus data until good values are submitted. In yet other aspects, outlier nodes may receive a reputation score, which may be adjusted based on the outlier submission, and may be allowed to participate in the consensus data calculation based on the reputation score. For example, if the outlier submission brings the network node's reputation score below a predetermined threshold, the network node may not be allowed to participate in the consensus data calculation. However, if the network node's reputation score meets or exceeds the threshold, the network node may be allowed to participate in the consensus data calculation.

In some aspects, after having identified any outliers at block 308, smart contract module 122 may send a request to all network nodes that have not been designated as outliers to submit their respective market rates again. The request may be a signal or a message. The request may also allow a node to resubmit new rates for any rates that may have been submitted in error. It will be appreciated that, when network node 101a has not been designated as an outlier by the other network nodes, network node 101a may receive the request from the other network nodes. Similarly, it should be appreciated that a network node that has been designated as an outlier may not receive the request to resubmit the market rates.

At block 310, in response to the request to resubmit market rates, smart contract module 122 of network node 101a may resubmit the market rates without obfuscating the data. For example, smart contract module 122 may send the actual market rates to the network node 101c, as network node 101c was not designated as an outlier, without applying a homomorphic algorithm to the market values. Similarly, every other network node not designated as an outlier, or that has been authorized to resubmit the market rates, may send their respective market rates to network node 101a. It should be appreciated that, during this operation, the participant network nodes may view each other's submissions, although the identities of the participants may still be anonymous as the data values are shared between the network nodes via the distributed ledger implemented in smart contract module 122.

Smart contract module 122 may receive the market rate data from the other network nodes and may aggregate the received data with its own market rates to generate aggregated market data. At step 312, network node 101a calculates a consensus data value for the market instrument based on the aggregated data. In some aspects, calculating the consensus data may include calculating a value using statistical analysis such as an average of the aggregated values for a particular rate. For example, in some implementations, the highest value and the lowest value may be removed from the aggregated values, and after removal, an arithmetic average may be calculated on the remaining values of the aggregated values. In some aspects, removing the highest and lowest value from the data set before calculating the average may be implemented in each of the consensus data calculation approaches discussed herein. In alternative or additional aspects, calculating the consensus data may include calculating a weighted average of market rates submitted by particularly reputable sources or by submitters who hold significant portions of the holdings associated with the market instruments.

Calculation Chip Approach

Figure 4:
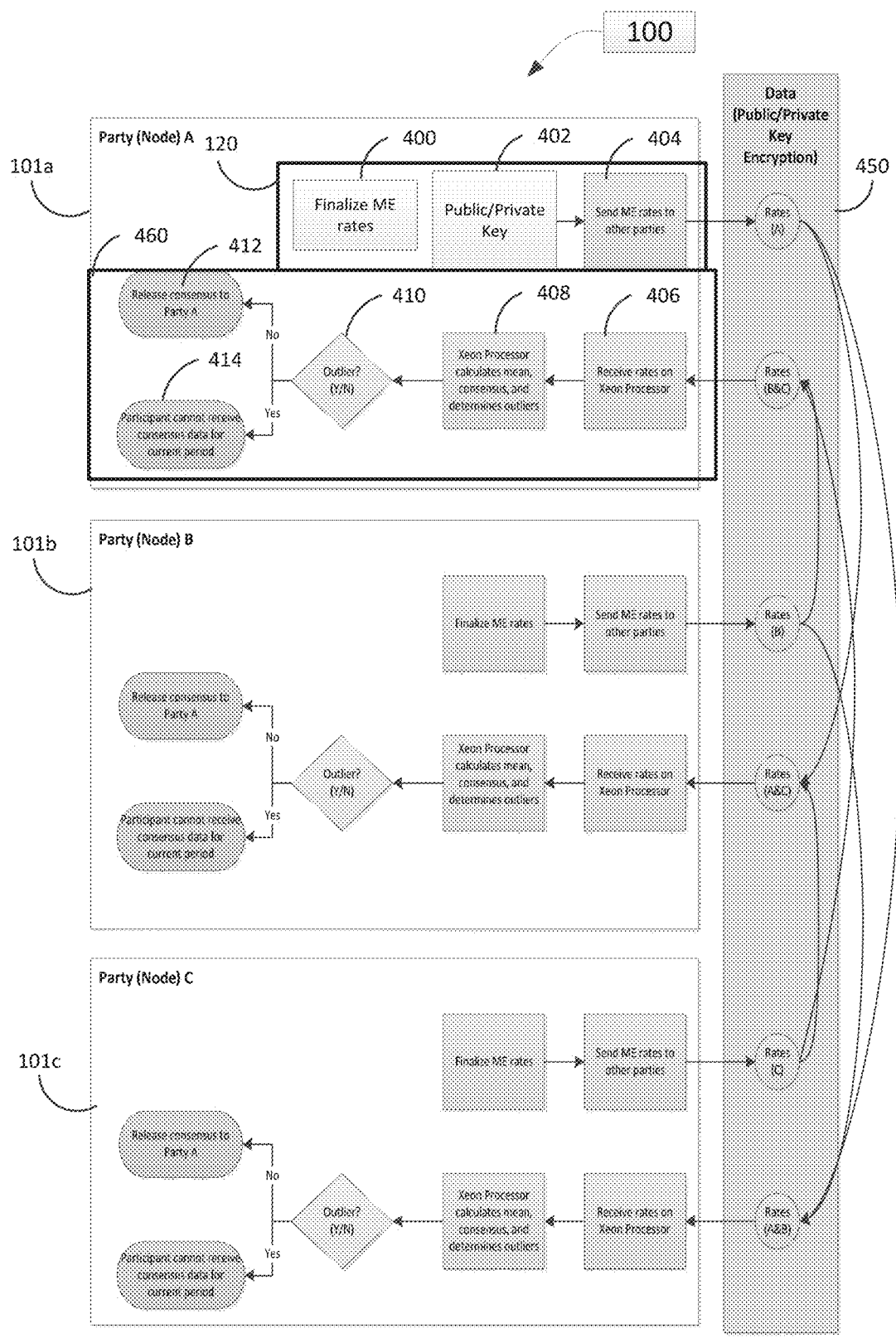
FIG. 4 is another exemplary functional diagram for calculating consensus data in a peer-to-peer network according to aspects of the present disclosure.

In further aspects of the present disclosure, consensus data for a decentralized P2P network may be calculated implementing a calculation chip approach. FIG. 4 shows an exemplary functional diagram illustrating one aspect implementing the calculation chip approach in accordance with aspects of the present disclosure. As shown in FIG. 4, exemplary network nodes 101a-c may each include a data sharing module and a calculation chip. As used herein, a calculation chip may refer to a processor, electronics device, hardware device, electronics component, logical circuit, etc. (e.g., Intel SGX chip, Intel Xeon processor, a cloud or data center-hosted Hardware Security Module (HSM), or other hardware and/or software that provides equivalent functionality for secure cryptographic storage in hosted environments) to perform operations in accordance with aspects of the present disclosure. In aspects, each participant network node may include a calculation chip, and the smart contract module logic of each participant network node may be implemented in a calculation chip residing in the respective network node. In some aspects, the interior hardware and the software logic implementing the operations of the calculation chip may be inaccessible to the network nodes in which the calculation chip resides. For example, the interior hardware and the software logic implementing the operations of calculation chip 460 may be inaccessible to network node 101a. As such, network node 101a may not manipulate, modify, or otherwise control the operations of calculation chip 460, except to provide the market rate data for calculating the consensus data.

At block 400, data sharing module 120 may finalize market rates associated with a particular market instrument. As noted above, these market rates may represent market data compiled for an accounting period of a particular firm associated with network node 101a. For example the market rates may be associated with a market instrument for a set interval set by the administrators of the system. At block 402, smart contract module 122 may obfuscate the market rates. For example, smart contract module 122 may apply an asymmetric cryptographic algorithm to calculate, for each market rate, an encrypted data value. As used herein, an asymmetric cryptographic algorithm may also refer to public key cryptographic scheme, e.g., a public key/private key encryption. In public key cryptography, a public key and a private key are used to encrypt and decrypt data. Typically, the public key and the private key have been paired together but are not identical (asymmetric). The public key is generally publicly available. The private key is kept secret. Either of the keys may be used to encrypt data, but the opposite key from the one used to encrypt the data is used for decryption. For example, smart contract module 122 may encrypt the market rates using a public key associated with the calculation chip of the other network nodes. Each public key may have an associated private key for the encryption/ decryption operation. The confidentiality of the private key may be preserved using strong access control, e.g., a secure enclave such as Intel SGX, a cloud or data center-hosted Hardware Security Module (HSM), or other hardware and/or software that provides equivalent functionality for secure cryptographic storage in hosted environments. In some embodiments, even stronger key security may be accomplished using a threshold-based secret sharing scheme such as Shamir's secret sharing, where the secret may be reconstructed only when a sufficient number of possibly different types of shares are combined together. In that case, individual shares may be of no use on their own.

In aspects, the public key signing may signify that the encryption was performed by the authorized calculation chip (such as Intel SGX, or cloud or data center-hosted Hardware Security Module (HSM), etc.) which provides authenticity as well as confidentiality, and the calculation chip may be physical, or virtualized and/or hosted in the cloud or on-premise environment. In aspects, multiple public keys may be used. In those cases, one or more public keys may be provided to each participant, while one or more private keys may be securely shared/escrowed using m of n algorithms such as Shamir's Secret sharing. In some implementations, public key infrastructure (PKI) may be used, with key pairs. In alternative or additional implementations, hybrid cryptography may be used to encrypt a message with symmetric algorithm and then encrypting the symmetric key with the recipient's public key. Any and all of the secrets may be stored on-premise or in a hosted/cloud or virtualized environments using a Hardware Security Module (HSM), which may be implemented in the cloud, and the keys may be automatically and securely retrieved using industry-standard APIs, such as PKCS #11, Java Cryptography Extensions (JCE), Microsoft CryptoNG (CNG) libraries, etc.

At block 404, the encrypted data values calculated for each market rate may be sent to other network nodes of network 100. For example, data sharing module 122 of network node 101*a* may transmit the encrypted data values for each market rate to network nodes 101*b* and 101*c*. Network nodes 101*b* and 101*c* may also calculate encrypted data values for each of their respective market rates and share the encrypted data values with the other nodes. For example, network node 101*b* may share the encrypted data values with network nodes 101*a* and 101*c*, and network node 101*c* may share the encrypted data values with network nodes 101*a* and 101*b*. As such, as seen at block 450, the encrypted data values for each network node are shared across the entire network 100. In some aspects, the encrypted data values are shared between the network nodes via a distributed ledger implemented in the calculation chips of the network nodes. For example, network node 101*a* may share the encrypted data values with network nodes 101*b* and 101*c* via a distributed ledger implemented by the calculation chips over network nodes 101*a*, 101*b*, and 101*c*.

At block 406, calculation chip 460 of network node 101*a* may receive the encrypted data values representing the data values from network nodes 101*b* and 101*c*, and may decrypt the data values using a private key. Calculation chip 460 may then aggregate network node 110*a*'s own data values with the decrypted data values received from network nodes 101*b* and 101*c*. In some aspects, decryption of the data values received from the other network nodes by calculation chip 460 may not reveal the data values to network node 101*a* because, as noted above, calculation chip 460 is configured to prevent the network node 101*a* from accessing the data processed by the smart contract executed in calculation chip 460.

At block 408, calculation chip 460 may calculate a mean and standard deviation for the aggregated data values. For example, calculation chip 460 of network node 101*a* may calculate the mean and standard deviation of the aggregated data values from network nodes 101*a-c*. Also at block 408, calculation chip 460 of network node 101*a* may apply a rule set to the combination of encrypted data values to determine any outlier network nodes. For example, calculation chip 460 of network node 101*a* may measure every data point represented by the data values from the network nodes to determine any data value that lies beyond a threshold amount of standard deviations from the calculated mean. For example, calculation chip 460 may measure every data point represented by the data values from the network nodes to determine any data values that lie beyond two standard deviations from the calculated mean. In this example, any data value determined to lie beyond two standard deviations from the calculated mean may be designated an outlying value. The particular network nodes that submitted the outlying values may then be identified and calculation chip 460 may designate those particular network nodes as outliers. In some aspects, when the outlying value lies beyond two standard deviations from the calculated mean, the associated network node may be designated as a "significant" outlier. In some aspects, a quality check may be applied to values that lie within two standard deviations from the calculated mean. Any value that fails the quality check may be designated a not significant outlying value and the associated network node may be designated as a "not significant" outlier. For example, when calculation chip 460 of network node 101*a* determines that a value in the encrypted data values received from network node 101*b* lies within two standard deviations from the calculated mean, a quality check may be applied. If the encrypted data value fails the quality check, then calculation chip 460 may designate network node 101*b* as a not significant outlier. In the same example, if calculation chip 460 of network node 101*a* determines that no value in the encrypted data values received from network node 101*c* lies beyond two standard deviations from the calculated mean, and no value in the encrypted data values fails the quality check, then network node 101*c* may not be designated as an outlier.

In aspects, any node designated as an outlier based on the calculation at block 308 may not be allowed to participate in the consensus data calculation. For example, having identified network node 101*b* as an at block 308, calculation chip 460 would not include the data values received from network 101*b* in the calculation of the consensus data. However, in some aspects, outlier network nodes that submitted a data point that lies beyond two standard deviations from the mean of all submissions may still be allowed to receive the consensus data, once calculated, for a fee, as described with respect to FIG. 7 below. In these cases, the calculation chip may issue a message or a signal to the outlier network node indicating that the network node has been deemed an outlier, and may provide instructions or steps on how to pay the fee to receive the consensus data. For example, if network node 101*a* were designated as an outlier network node, calculation chip 460 may issue a message to network node 101*a* indicating that network node 101*a* has been designated an outlier node and may provide instructions on how to pay a fee to obtain the consensus data. In some aspects, outlier network nodes that submit a data point that lies beyond two standard deviations of the mean of all submissions, or that fails the quality check, twice in a row, may not be allowed to receive the consensus data results, even for a fee. In further aspects, outlier network nodes that submit a data point that lies beyond two standard deviations from the mean of all submissions, or that fails the quality check, more than twice in a row, may not be allowed to receive the consensus data results, even for a fee, and may be prevented from participating and/or receiving the consensus data until good values are submitted. In yet other aspects, outlier nodes may receive a reputation score, which may be adjusted based on the outlier submission, and may be allowed to participate in the consensus data calculation based on the reputation score. For example, if the outlier submission brings the network node's reputation score below a predetermined threshold, the network node may not be allowed to participate in the consensus data calculation. However, if the network node's reputation score meets or exceeds the threshold, the network node may be allowed to participate in the consensus data calculation.

Still at block 408, calculation chip 460, after removing the outlying data values from the aggregated data values, may calculate a consensus data value for the market instrument based on the aggregated data values. In some aspects, calculating the consensus data includes calculating a value using statistical analysis such as an average of the aggregated values for a particular rate. For example, in some implementations, the highest value and the lowest value may be removed from the aggregated values, and after removal, an arithmetic average may be calculated on the remaining values of the aggregated values. In some aspects, removing the highest and lowest value from the data set before calculating the average may be implemented in each of the consensus data calculation approaches discussed herein. In alternative or additional aspects, calculating the consensus data may include calculating a weighted average of market rates submitted by particularly reputable sources or by submitters who hold significant portions of the holdings associated with the market instruments.

At block 410, calculation chip 460 of network node 101a may determine if network node 101a has been designated an outlier. If calculation chip 460 determines that network node 101a has been designated an outlier, then calculation chip 460 may not, at block 414, release the calculated consensus data to network node 101a. However, if at block 410, calculation chip 460 determines that network node 101a has not been designated an outlier, then calculation chip 460, at block 412, may release the consensus data results to network node 101a. Similarly, the calculation chips of network nodes 101b and 101c determine if their respective network nodes have been designated as outliers and release the consensus data results to the respective network node only when the network node has not been designated an outlier.

Difference from Mean Approach

Figure 5:
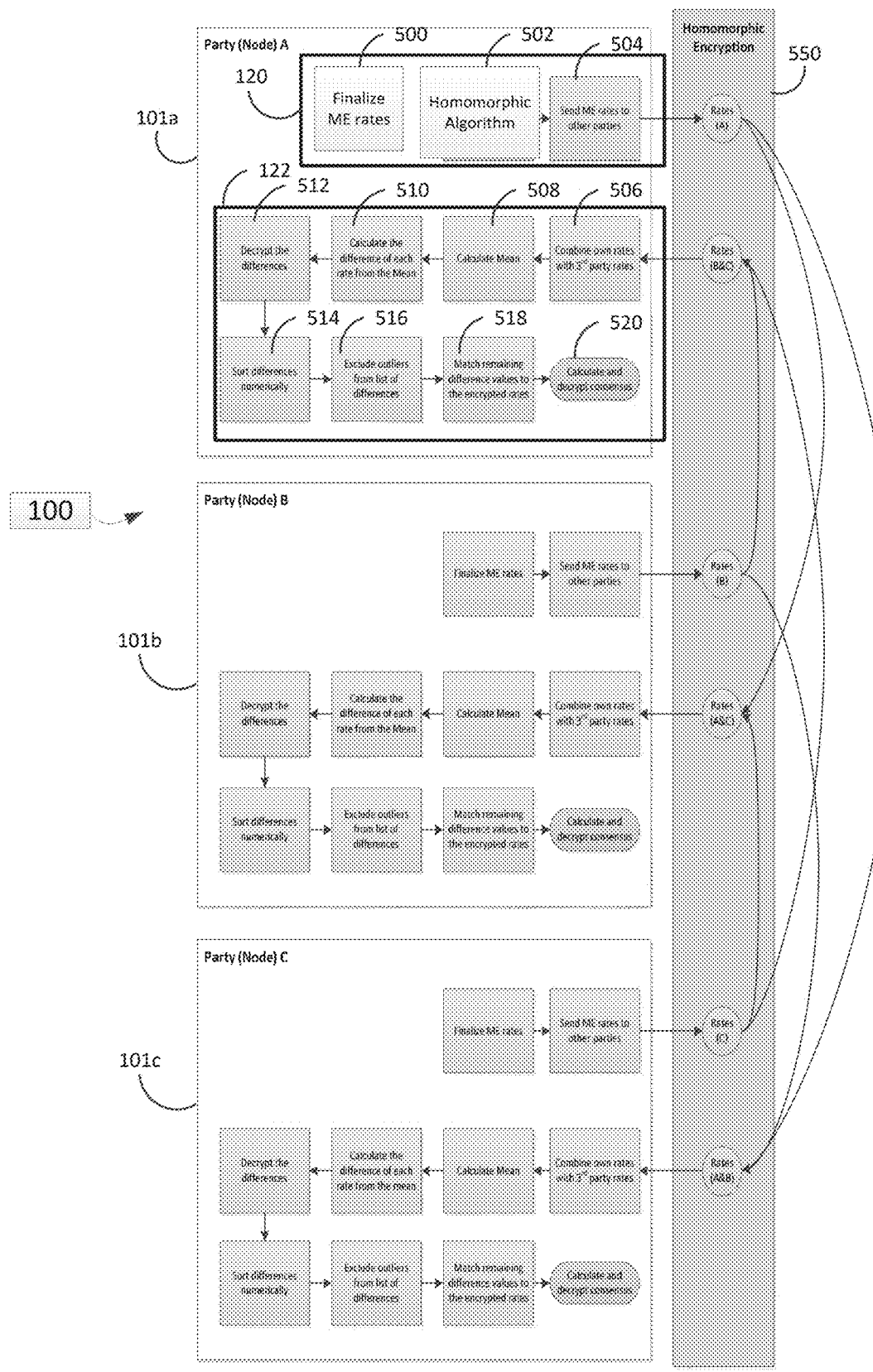
FIG. 5 is another exemplary functional diagram for calculating consensus data in a peer-to-peer network according to aspects of the present disclosure.

In further aspects of the present disclosure, consensus data for a decentralized P2P network may be calculated implementing a difference from mean approach. FIG. 5 shows an exemplary functional diagram illustrating one aspect implementing a difference from mean approach in accordance with aspects of the present disclosure. As shown in FIG. 5, exemplary network nodes 101a-c may each include a data sharing module and a smart contract module. Although FIG. 5 is primarily described with respect to network node 101a, it is noted that the described operations may be also be performed by network nodes 101b and 101c, and other network nodes not shown.

At block 500, data sharing module 120 may finalize market rates associated with a particular market instrument. As noted above, these market rates may represent market data compiled for an accounting period of a particular firm associated with network node 101a. At block 502, smart contract module 122 may obfuscate the market rates. For example, smart contract module 122 may apply a homomorphic algorithm to calculate, for each market rate, a homomorphically encrypted ciphertext value. At block 504, the encrypted ciphertext calculated for each market rate may be sent to other network nodes of network 100. For example, data sharing module 122 of network node 101a may transmit the encrypted ciphertext for each market rate to network nodes 101b and 101c. Network nodes 101b and 101c may also calculate an encrypted ciphertext for each of their respective market rates and share the encrypted ciphertexts with the other nodes. For example, network node 101b may share the encrypted ciphertexts with network nodes 101a and 101c, and network node 101c may share the encrypted ciphertexts with network nodes 101a and 101b. As such, as seen at block 550, the encrypted ciphertexts for each network node are shared across the entire network 100. In some aspects, the encrypted ciphertexts are shared between the network nodes via a distributed ledger. For example, network node 101a may share the encrypted ciphertext with network nodes 101b and 101c via a distributed ledger implemented over network nodes 101a, 101b, and 101c.

Smart contract module 122 of network node 101a may receive the encrypted ciphertext representing the data values from network nodes 101b and 101c and, at block 506, may combine its own encrypted ciphertext with the encrypted ciphertexts received from network nodes 101b and 101c. For example, smart contract module 122 may aggregate the encrypted ciphertext calculated at block 502 with the encrypted ciphertexts received from network nodes 101b and 101c. At block 508, smart contract module 122 may calculate the mean of the aggregated encrypted ciphertext values from network nodes 101a-c. At block 510, smart contract module 122 may calculate the difference between the mean of the aggregated encrypted ciphertext values and each encrypted ciphertext value submitted by the participant network nodes and generate a list of differences, where each difference value in the list may correspond to an encrypted ciphertext value. For example, smart contract module 122 may calculate the difference between the mean of the aggregated encrypted ciphertext values from network nodes 101a-c and each of the encrypted ciphertext values submitted by network node 101a. Similarly, smart contract module 122 may calculate the difference between the mean of the aggregated encrypted ciphertext values from network nodes 101a-c and each of the encrypted ciphertext values submitted by network node 101b and 101c. At block 512, smart contract module 122 may decrypt the differences in the list of differences calculated at block 510.

At block 514, smart contract module 122 may sort the list of differences from the mean numerically. For example, smart contract module 122 may rank the list of calculated differences based on their value. In some aspects, the differences from the mean value may have a positive or negative value. At block 516, smart contract module 122 may determine those differences in the list with values that are greater than a predetermined threshold. In some aspects, the predetermined threshold may be a percentage or a value that may be used to determine whether a difference may be removed from the list. Any difference determined to exceed the predetermined threshold may be deemed an outlier and may be removed the list of differences. In some aspects, the encrypted ciphertext values corresponding to the outlier differences may also be identified and deemed an outlying value. In this case, the network node that submitted the outlying value may also be deemed an outlier network node. In aspects, a network node with no associated outlier difference may still be designated as an outlier based on the result of a quality check applied to the submitted values.

At block 518, smart contract module 122 may identify the encrypted ciphertext values corresponding to every decrypted difference that remains in the list of differences after the outlier differences have been removed. For example, after outlier differences have been identified and removed from the list of differences, smart contract module 122 may identify, for each difference remaining in the list of differences, the corresponding encrypted ciphertext value. At block 520, smart contract module 122 may calculate a consensus of the encrypted ciphertext values corresponding to the differences remaining among the list of differences. The calculated encrypted consensus may then be decrypted to obtain a consensus data value for the market instrument. In some aspects, calculating the consensus may include calculating a value using statistical analysis such as an average of the values for a particular rate. For example, in some implementations, the highest value and the lowest value may be removed from the aggregated values, and after removal, an arithmetic average may be calculated on the remaining values of the aggregated values. In some aspects, removing the highest and lowest value from the data set before calculating the average may be implemented in each of the consensus data calculation approaches discussed herein. In alternative or additional aspects, calculating the consensus data may include calculating a weighted average of market rates submitted by particularly reputable sources or by submitters who hold significant portions of the holdings associated with the market instruments.

In some aspects, smart contract module 122 may release the consensus data results to network node 101*a* if network node 101*a* has not been designated as an outlier node. Otherwise, smart contract module may issue a message or a signal to network node 101*a* indicating that network node 101*a* has been deemed an outlier, and may provide instructions or steps on how to pay the fee to receive the consensus data. In yet other aspects, outlier nodes may receive a reputation score, which may be adjusted based on the outlier submission, and may be allowed to participate in the consensus data calculation based on the reputation score. For example, if the outlier submission brings the network node's reputation score below a predetermined threshold, the network node may not be allowed to participate in the consensus data calculation. However, if the network node's reputation score meets or exceeds the threshold, the network node may be allowed to participate in the consensus data calculation.

Central Counterparty/Calculation Agent Approach

Figure 6:
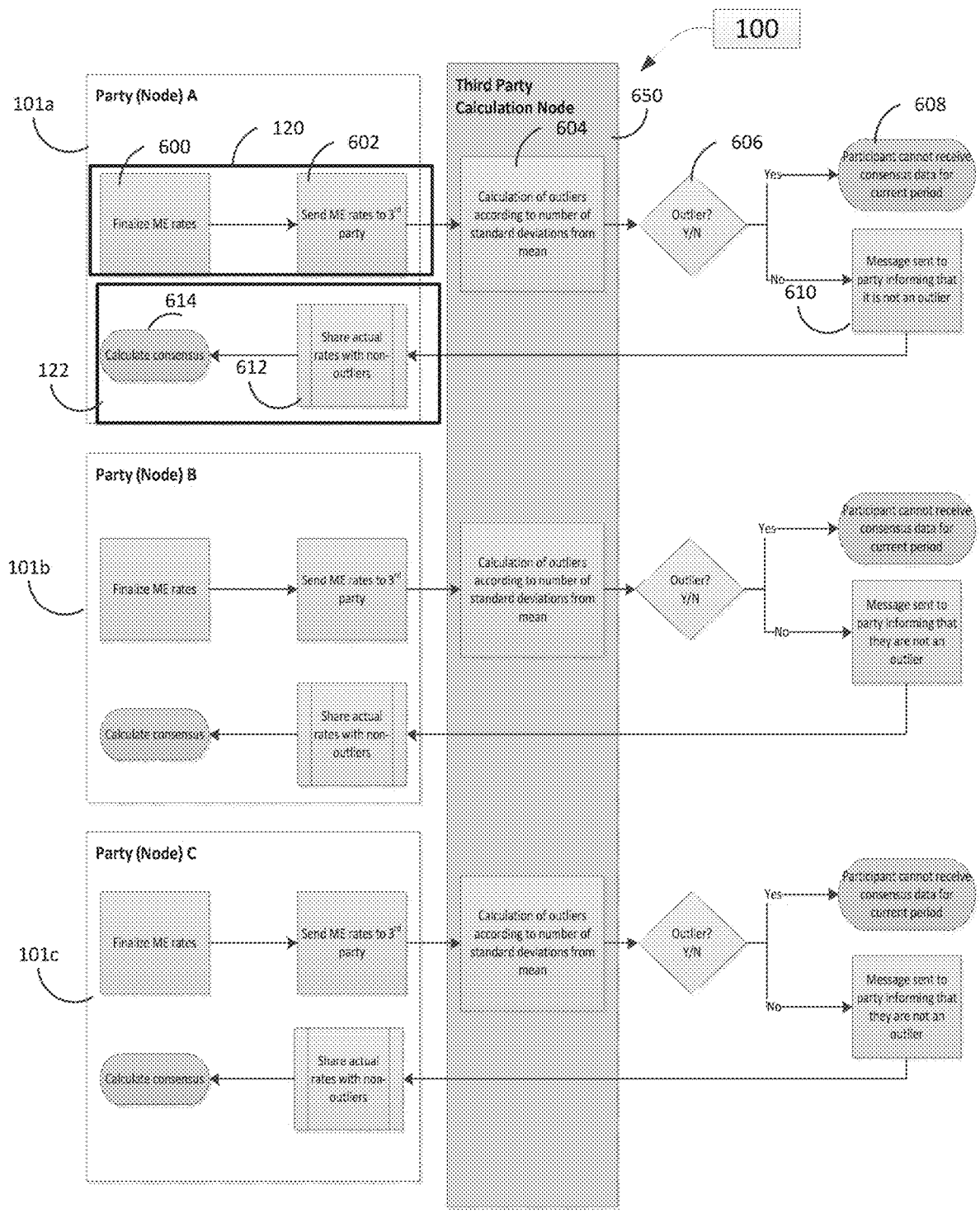
FIG. 6 is another exemplary functional diagram for calculating consensus data in a peer-to-peer network according to aspects of the present disclosure.

In further aspects of the present disclosure, consensus data for a decentralized P2P network may be calculated implementing a central counterparty/calculation agent approach. FIG. 6 shows an exemplary block diagram illustrating one aspect implementing a central counterparty/calculation agent approach in accordance with aspects of the present disclosure. As shown in FIG. 6, exemplary network 100 may include network nodes 101*a-c*, and calculation node 650. In some aspects, each of network nodes 101*a-c* may include a data sharing module and a smart contract module. Calculation node 650 may be a network node similar to network nodes 101*a-c* and may be communicatively coupled to each of network nodes 101*a-c*. In some aspects, calculation node 650 may be configured to receive data values from the network nodes of network 100 and to calculate and determine outlying values to designate outlier network nodes, in accordance with the present disclosure. Calculation node 650 may be physically separate from any of network nodes 101*a-c*, and may be configured to prevent access to modify, change, or otherwise manipulate the logic executing in calculation node 650 by any of the network nodes. In these aspects, network nodes may be allowed to transmit market data to the calculation node 650 and to receive an indication of whether the network node is an outlier, but may not be allowed to control the operations of calculation node 650. In some implementations, calculation node 650 may include smart contract logic executing on the computer environment of calculation node 650.

During operations, at block 600, data sharing module 120 may finalize market rates for a particular market instrument. As noted above, these market rates may represent market data compiled for an accounting period of a particular firm associated with network node 101*a*. At block 602, smart contract module 122 may transmit data values corresponding to the market rates to calculation node 650. Network nodes 101*b* and 101*c* may similarly transmit their respective market rates to calculation node 650.

Calculation node 650 may receive the data values from network nodes 101*a-c* and, at block 604, may perform calculations to determine any outlying values and to determine any outlier network nodes. For example, calculation node 650 may aggregate the data values received from each of network nodes 101*a-c*, and may then calculate the mean of the aggregated data values from network nodes 101*a-c*. In some aspects, calculation node 650 may also calculate the standard deviation of the aggregated data values from network nodes 101*a-c*. Calculation node 650 may then measure every data point represented by each data value from network nodes 101*a-c* to determine any value that lies beyond an acceptable range from the calculated mean. For example, calculation node 650 may determine any data value whose distance from the calculated mean is larger than a predetermined threshold. In some aspects, the predetermined threshold may be a percentage, a fraction, or a number of standard deviations from the calculated mean. Any data value whose distance from the calculated mean exceeds the predetermined threshold may be designated as an outlying value. For example, any data value determined by calculation node 650 to lie beyond one standard deviation from the calculated mean may be designated an outlying value. Moreover, calculation node 650 may designate any network node that submitted the outlying values as an outlier node. In some aspects, when the outlying value lies beyond two standard deviations from the calculated mean, the associated network node may be designated as a "significant" outlier. In aspects, values that lie within the threshold amount of standard deviations from the calculated mean may be designated a not significant outlier if values fail a quality check. For example, when calculation node 650 determines that a data value submitted by network node 101*b* lies within two standard deviations from the calculated mean, but the value fails the quality check, then calculation node 650 may designate network node 101*b* as a not significant outlier. In the same example, if calculation node 650 determines that no value in the data values received from network node 101*c* lies beyond two standard deviations from the calculated mean, and no value fails the quality check, then network node 101*c* may not be designated as an outlier.

At block 606, calculation node 650 may determine if a particular network node has been designated as an outlier. If calculation node 650 determines that the particular network node has been designated an outlier, then calculation node 650 may determine, at block 608, that the particular network node may not participate in the consensus data and may not receive the consensus data results. For example, if calculation node 650 determines that network node 101*a* has been designated an outlier, then calculation node 650 may determine that network node 101*a* may not receive the consensus data results. In some aspects, calculation node 650 may determine that an outlier node may not participate in the calculation of the consensus data, but may receive the consensus data for a fee. For example, if an outlier node is determined to be a significant outlier, for the first time, the outlier node may not be allowed to participate in the consensus data calculation, but may be allowed to receive the consensus data results for a fee. In some aspects, a network node determined to be a not significant outlier for the first time may not be allowed to participate in the consensus data calculation, but may be allowed to receive the consensus data results for free. In some aspects, outlier network nodes that submit a significant outlying data point, or that fail the quality check, twice in a row, may be allowed to receive the consensus data results for a fee. In further aspects, outlier network nodes that submit a significant outlying data point, or that fail the quality check, more than twice in a row, may not be allowed to receive the consensus data results, even for a fee, and may be prevented from participating and/or receiving the consensus data until good values are submitted. If at block 606, calculation node 650 determines that the particular network node has not been designated an outlier, then calculation node 650 may determine, at block 610, that the particular network node may participate in the consensus data calculation and receive the consensus data results for free. In some aspects, calculation node 650 may send a message to each participant network node indicating that the respective participant network node is one of: allowed to participate in and receive consensus data; not allowed to participate in or receive consensus data; and may participate in and receive the consensus data for a fee. In yet other aspects, outlier nodes may receive a reputation score, which may be adjusted based on the outlier submission, and may be allowed to participate in the consensus data calculation based on the reputation score. For example, if the outlier submission brings the network node's reputation score below a predetermined threshold, the network node may not be allowed to participate in the consensus data calculation. However, if the network node's reputation score meets or exceeds the threshold, the network node may be allowed to participate in the consensus data calculation.

In some aspects, calculation node 650 may send a request to all network nodes that have not been designated as outliers to resubmit their respective data values. In some aspects, the data values from each node may be resubmitted to the other network nodes, instead of resubmitting the data values to calculation node 650. For example, smart contract module 122 of network node 101*a* may receive a message from calculation node 650 requesting that network node 101*a* resubmit data values. In response to the request, at block 612, smart contract module 122 may resubmit the market rates to network nodes 101*c*, as network node 101*c* was not designated as an outlier. Similarly, every other network node not designated as an outlier may send their respective data values to network node 101*a*. It should be appreciated that, during this operation, the participant network nodes may view each other's submissions, although the identities of the participants may still be anonymous as the data values are shared between the network nodes via the distributed ledger implemented in smart contract module 122.

Smart contract module 122 may receive the data values from the other network nodes and may aggregate the received data values with its own corresponding data values to generate aggregated data values. At step 614, network node 101*a* may calculate a consensus data value for each data value based on the aggregated data values. In some aspects, calculating the consensus data may include calculating a value using statistical analysis such as an average of the aggregated data values. For example, in some implementations, the highest value and the lowest value may be removed from the aggregated values, and after removal, an arithmetic average may be calculated on the remaining values of the aggregated values. In some aspects, removing the highest and lowest value from the data set before calculating the average may be implemented in each of the consensus data calculation approaches discusses herein. In alternative or additional aspects, calculating the consensus data may include calculating a weighted average of market rates submitted by particularly reputable sources or by submitters who hold significant portions of the holdings associated with the market instruments.

Payment for Consensus Data

Figure 7:
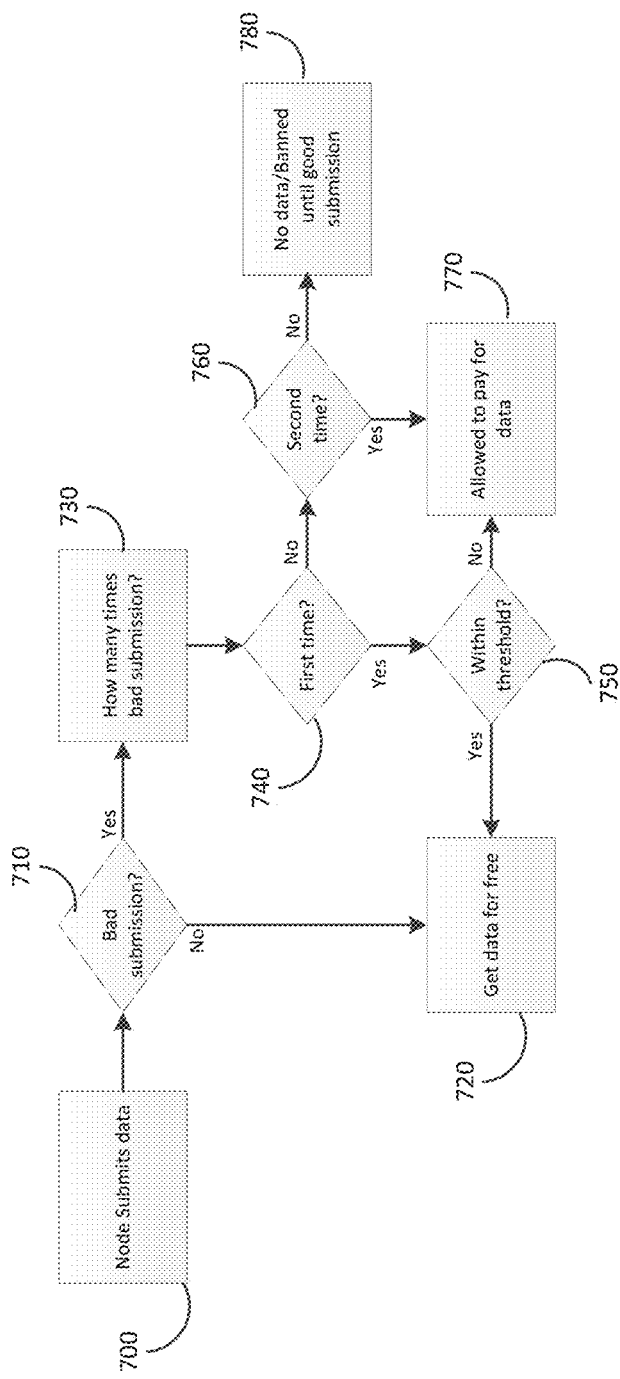
FIG. 7 is an exemplary functional diagram of example blocks executed to implement aspects of the present disclosure.

FIG. 7 is a functional diagram illustrating example blocks executed to implement one aspect of the present disclosure. In particular FIG. 7 illustrates a process for determining whether an outlier network node may be allowed to either participate in the calculation of the consensus data, or to receive the consensus data, even for a fee. At block 700, a network node may submit data for consensus data calculations. For example, a network node may submit data in accordance with any of the techniques discussed herein. At block 710, the submitted data is analyzed to determine if the data is a bad submission. In some aspects, a bad submission is data that is determined to be an outlier. The data may be determined to be an outlier in accordance with any of the techniques discussed herein. In some aspects, the data may be determined to be a bad submission when the data lies beyond a threshold number of standard deviations. In aspects, the data may be determined to be a bad submission when the data fails a quality check, even if the data is within the threshold number of standard deviations. In some aspects, the threshold check may be performed before the quality check. In other aspects, the quality check may be performed before the threshold check. A data submission may be determined to not be a bad submission when the data passes the threshold test and the quality check. If the data submission is determined to not be a bad submission, then at block 720, the associated network node may receive the consensus data for free.

If at block 710, the data submission is determined to be a bad submission, then, at block 730, a determination as to how many consecutive times the associated network node has submitted a bad submission is made. At block 740, a determination is made as to whether the current bad submission from the network node is the first bad submission from the network node. In some instances, a first bad submission may refer to a bad submission that follows a good submission. In some aspects, a bad submission may be determined to be a first bad submission when the bad submission follows at least three good submissions. If the current bad submission is a first bad submission, then, at block 750, a determination is made as to whether the bad submission is within the threshold. If the bad submission is within the threshold, this may indicate that the bad submission has been deemed a bad submission because it may have failed the quality check. In this case, at block 720, the associated network node may be allowed to receive the consensus data for free. However, if, at block 750, it is determined that the bad submission is not within the threshold, then the associated network node may still be allowed to receive the consensus data, but may pay a fee to receive the consensus data.

With reference back to block 740, if it is determined that the current bad submission is not the first bad submission from the associated network node, then at block 760, a determination is made as to whether the current bad submission from the network node is a second bad submission from the network node. In some aspects, a second bad submission may comprise a bad submission that immediately follows a first bad submission. If the current bad submission is a second bad submission, then, at block 770, the associated network node may be allowed to receive the consensus data, but may pay a fee to receive the consensus data. It is noted that for a second bad submission, the associated network node may have to pay a fee to receive the consensus data even if the data is within the threshold value, but has failed the quality check.

With reference back to block 760, if it is determined that the current bad submission is not the second bad submission from the associated network node, then this may indicate that the associated network node has made bad submissions at least three times in a row. In this case, at block 780, the associated network node may not receive the consensus data, even for a fee to receive. In some aspects, the associated network node may also be prevented from participating in subsequent consensus data calculation rounds until the associated network node has submitted a good submission. In some instances, the network node may be prevented from participating until the associated network node has submitted good submissions three times in a row It should be appreciated that, although exemplary embodiments have been described with reference to wireless networks and/or wireless communications, the concepts herein are not limited to applicability to wireless implementations. Embodiments operable in accordance with the concepts herein may be implemented in any communication system, including wired communication systems, optical communication systems, etc., in which synchronization of network devices is desired.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-7 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed:

1. A network node for calculating a consensus value for a set of data values provided by a plurality of network nodes of a peer-to-peer network, the network node comprising:
    a processor; and
    a memory communicatively coupled to the processor, the memory storing instructions that, when executed by the processor, configure the processor to perform operations comprising:
        calculating data values corresponding to market rates associated with the network node;
        obfuscating the data values such that the calculated data values of the network node are hidden from other network nodes of the plurality of network nodes;
        transmitting the obfuscated data values to the other network nodes of the plurality of network nodes;
        receiving other obfuscated data values from the other network nodes;
        aggregating the obfuscated data values of the network node with the other obfuscated data values from the other network nodes to generate an aggregated set of obfuscated data values;
        applying a rule set to the aggregated set of obfuscated data values to determine outlying obfuscated data values of the aggregated set of obfuscated data values;
        designating, based on the outlying obfuscated data values, network nodes associated with the outlying obfuscated data values as outlier network nodes;
        transmitting an indication to a subset of the other network nodes that excludes the outlier network nodes that indicates the subset of other network nodes are not outlier network nodes, wherein the subset of network nodes resubmit, in response to the indication, other data values of the obfuscated other data values to other network nodes that are not designated as outlier network nodes;
        receiving resubmitted other data values from the subset of the other network nodes that excludes the outlier network nodes;
        aggregating the resubmitted other data values with the data values from the network node to generate a dataset of values; and
        calculating the consensus value based on the dataset of values, and
    wherein (i) the aggregating the obfuscated data values, (ii) the applying the rule set to the aggregated set of obfuscated data values, or (iii) the designating the network nodes associated with the outlying obfuscated data values, are performed without revealing corresponding obfuscated data values.

2. The network node of claim 1, wherein the obfuscating the data values comprises:
    calculating, for each data value of the data values, a range of values normally distributed around the each data value, wherein the calculated range of values is calculated such that the data value is the mean of the calculated range of values; and
    calculating a one-way hash for each value in the range of values to generate a range of hashed values.

3. The network node of claim 2, wherein the received other obfuscated data values from the other network nodes include ranges of hashed values corresponding to the other obfuscated data values, and wherein the aggregating the obfuscated data values comprises aggregating the received ranges of hashed values from the other network nodes and the range of hashed values for the network node.

4. The network node of claim 3, wherein applying the rule set to determine outlying obfuscated data values includes:
    overlaying the aggregated ranges of hashed values over one another;
    determining, for each range of the overlaid ranges of hashed values, a number of overlapped hashed values of the each range with hashed values of the other overlaid ranges of hashed values; and
    designating, when the number of overlapped hashed values of the each range does not exceed a predetermined threshold, an obfuscated data value of the aggregated set of obfuscated data values associated with the each range as an outlying obfuscated data value of the outlying obfuscated data values.

5. The network node of claim 1, wherein the obfuscating the data values comprises calculating a homomorphic ciphertext for each value of the data values, wherein the received other obfuscated data values from the other network nodes include homomorphic ciphertexts corresponding to the other obfuscated data values, and wherein the aggregating the obfuscated data values comprises aggregating the received homomorphic ciphertexts from the other network nodes and the homomorphic ciphertext for each value of the obfuscated data values of the network node.

6. The network node of claim 5, wherein the rule set to determine outlying obfuscated data values includes:
    calculating a mean value for the aggregated homomorphic ciphertexts;
    calculating, for each homomorphic ciphertext of the aggregated homomorphic ciphertexts, a difference from the calculated mean value to generate a list of difference values, wherein each difference value in the list corresponds to a respective homomorphic ciphertext;
    decrypting each difference value in the list of difference values;
    ranking the difference value in the list of difference values based on the value of each difference value;

determining difference values in the list of difference values that exceed a predetermined difference threshold; and designating homomorphic ciphertexts corresponding to the difference values determined to exceed the predetermined difference threshold as outlying obfuscated data values.

7. The network node of claim 6, wherein the calculating the consensus value comprises:

removing the difference values determined to exceed the predetermined difference threshold from the list of difference values;

identifying encrypted ciphertexts corresponding to difference values remaining in the list of difference values;

calculating an encrypted consensus value based on the identified encrypted ciphertexts; and decrypting the encrypted consensus value to obtain the consensus value.

8. The network node of claim 1, wherein the obfuscating the data values comprises applying an asymmetric encryption algorithm to each value of the data values, wherein the received other obfuscated data values from the other network nodes include asymmetrically encrypted values corresponding to the other obfuscated data values, and wherein the aggregating the obfuscated data values comprises aggregating the received asymmetrically encrypted values from the other network nodes and the asymmetrically encrypted value for each value of the data values of the network node.

9. The network node of claim 1, wherein the operations further comprise:

releasing the consensus value to the subset of the other network nodes that exclude the outlier network nodes; or preventing release of the consensus value to the outlier network nodes.

10. The network node of claim 1, wherein the rule set to determine outlying obfuscated data values includes:

calculating a mean value and a standard deviation value for the aggregated set of obfuscated data values;

determining, for each data value of the aggregated set of obfuscated data values, a distance from the calculated mean value, wherein the distance is measured in terms of the standard deviation value; and wherein the designating the network nodes comprises:

designating, when the distance of one of the each data value exceeds two standard deviation values, the one of the each data value as an outlying obfuscated data value of the outlying obfuscated data values, and a network node associated with the outlying obfuscated data value as an outlier network node.

11. The network node of claim 10, wherein the rule set to determine outlying obfuscated data values further includes:

applying a quality check to each data value of the aggregated set of obfuscated data values having a distance from the calculated mean value that does not exceed two standard deviations;

designating the network node associated with the outlying obfuscated data value as a significant outlier network node when the distance of the outlying obfuscated data value from the calculated mean value exceeds two standard deviation values; and wherein the designating the network nodes comprises:

designating, when one of the each data value of the aggregated set of obfuscated data values having a distance from the calculated mean value that does not exceed two standard deviations fails the quality check, the network node associated with the one of the each data value as a not significant outlier network node.

12. The network node of claim 1, wherein the calculated consensus value is provided to one or more of the outlier network nodes when a fee is paid by a user associated with the one or more of the outlier network nodes.

13. A method for calculating a consensus value for a set of data values provided by a plurality of network nodes of a peer-to-peer network, the method comprising:

calculating, by a network node of the plurality of network nodes, data values corresponding to market rates associated with the network node;

obfuscating, by the network node, the data values such that the calculated data values of the network node are hidden from other network nodes of the plurality of network nodes;

transmitting, by the network node, the obfuscated data values to other network nodes of the plurality of network nodes;

receiving, by the network node, other obfuscated data values from the other network nodes;

aggregating, by the network node, the obfuscated data values of the network node with the other obfuscated data values from the other network nodes to generate an aggregated set of obfuscated data values;

applying, by the network node, a rule set to the aggregated set of obfuscated data values to determine outlying obfuscated data values of the aggregated set of obfuscated data values;

designating, by the network node, based on the outlying obfuscated data values, network nodes associated with the outlying obfuscated data values as outlier network nodes;

transmitting, by the network node, an indication to a subset of the other network nodes that excludes the outlier network nodes that indicates the subset of other network nodes are not outlier network nodes, wherein the subset of network nodes resubmit, in response to the indication, other data values of the obfuscated other data values to other network nodes that are not designated as outlier network nodes;

receiving, by the network node, resubmitted other data values from the subset of the other network nodes that excludes the outlier network nodes;

aggregating, by the network node, the resubmitted other data values with the data values from the network node to generate a dataset of values; and calculating, by the network node, the consensus value based on the dataset of values, wherein the network node performs (i) the aggregating the obfuscated data values, (ii) the applying the rule set to the aggregated set of obfuscated data values, or (iii) the designating the network nodes associated with the outlying obfuscated data values, without revealing corresponding obfuscated data values.

14. The method of claim 13, wherein the rule set to determine outlying obfuscated data values includes:

calculating a mean value and a standard deviation value for the aggregated set of obfuscated data values;

determining, for each data value of the aggregated set of obfuscated data values, a distance from the calculated mean value, wherein the distance is measured in terms of the standard deviation value; and designating, when the distance of one of the each data value exceeds two standard deviation values, the one of the each data value as an outlying obfuscated data value of the outlying obfuscated data values, and a network node associated with the outlying obfuscated data value as an outlier network node.

15. The method of claim 14, wherein the designating network nodes associated with the outlying data values as outlier network nodes further includes:
   applying a quality check to each value of the aggregated set of obfuscated data values having a distance from the calculated mean value that does not exceed two standard deviations;
   designating the network node associated with the outlying obfuscated data value as a significant outlier network node when the distance of the outlying obfuscated data value from the calculated mean value exceeds two standard deviation values; and
   designating, when one of the each data value of the aggregated set of obfuscated data values having a distance from the calculated mean value that does not exceed two standard deviations fails the quality check, the network node associated with the one of the each data value as a not significant outlier network node.

16. A system for calculating a consensus value for a set of data values provided by a plurality of network nodes of a peer-to-peer network, the system comprising:
   a calculation node comprising:
      a first processor; and
      a first memory communicatively coupled to the first processor, the first memory storing first instructions that, when executed by the first processor, cause the first processor to perform first operations; and
   the plurality of network nodes, wherein at least one network node of the plurality of network nodes comprises:
      a second processor; and
      a second memory communicatively coupled to the second processor, the second memory storing instructions that, when executed by the second processor, configure the second processor to perform second operations comprising:
         calculating data values corresponding to market rates associated with the at least one network node;
         obfuscating the data values such that the calculated data values of the network node are hidden from other network nodes of the plurality of network nodes;
         transmitting the obfuscated data values to the calculation node of the system;
         receiving resubmitted data values from a subset of network nodes of the plurality of network nodes, wherein the subset of network nodes excludes network nodes designated as outlier network nodes by the calculation node;
         combining the data values of the at least one network node with the resubmitted data values from the subset of network nodes to generate a combined set of data values; and
         calculating the consensus value based on the combined set of data values; and
   wherein the first operations comprise:
      receiving the obfuscated data values from the at least one network node;
      receiving obfuscated other data values from the other network nodes;
      aggregating the obfuscated data values of the at least one network node with the obfuscated other data values from the other network nodes to generate an aggregated set of obfuscated data values;
      applying a rule set to the aggregated set of obfuscated data values to determine outlying obfuscated data values of the aggregated set of obfuscated data values;
      designating, based on the outlying obfuscated data values, network nodes associated with the outlying obfuscated data values as outlier network nodes; and
      sending an indication to each network node of the plurality of network nodes indicating whether each network node is an outlier network node or is not an outlier network node, wherein a particular network node receiving the indication from the calculation node indicating that the particular network node is not an outlier network node resubmits, in response to the indication, data values of the particular network node to other network nodes that are not designated as outlier network nodes; and
   wherein the calculation node performs (i) the aggregating the obfuscated data values, (ii) the applying the rule set to the aggregated set of obfuscated data values, or (iii) the designating the network nodes associated with the outlying obfuscated data values, without revealing corresponding obfuscated data values.

* * * * *